US011073650B2

(12) United States Patent
Ono et al.

(10) Patent No.: US 11,073,650 B2
(45) Date of Patent: Jul. 27, 2021

(54) DISPLAY DEVICE FOR VEHICLES

(71) Applicant: DENSO CORPORATION, Kariya (JP)

(72) Inventors: Kouzou Ono, Kariya (JP); Takuo Yamamoto, Obu (JP); Shizuo Nagata, Obu (JP); Yuuki Uekubo, Obu (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 16/390,050

(22) Filed: Apr. 22, 2019

(65) Prior Publication Data
US 2019/0243053 A1    Aug. 8, 2019

Related U.S. Application Data

(63) Continuation of application No. PCT/JP2017/033184, filed on Sep. 14, 2017.

(30) Foreign Application Priority Data

Nov. 8, 2016   (JP) .............................. JP2016-218280
Apr. 28, 2017  (JP) .............................. JP2017-089369

(51) Int. Cl.
B60K 35/00       (2006.01)
B60K 37/02       (2006.01)
F21V 8/00        (2006.01)
G01D 13/04       (2006.01)
G01D 7/00        (2006.01)

(52) U.S. Cl.
CPC .......... *G02B 6/0036* (2013.01); *B60K 35/00* (2013.01); *B60K 37/02* (2013.01); *G01D 7/00* (2013.01); *G01D 13/04* (2013.01); *G02B 6/0068* (2013.01); *B60K 2370/152* (2019.05); *B60K 2370/154* (2019.05); *B60K 2370/167* (2019.05); *B60K 2370/23* (2019.05); *B60K 2370/336* (2019.05); *B60K 2370/341* (2019.05)

(58) Field of Classification Search
CPC ................................................ B60K 2370/347
See application file for complete search history.

(56) References Cited

U.S. PATENT DOCUMENTS 6,079,838 A     6/2000 Parker et al.
2005/0122591 A1* 6/2005 Parker .................. G02B 6/0065
                                                    359/619
2016/0189345 A1  6/2016 Fujita et al.

FOREIGN PATENT DOCUMENTS

JP    H03085586 A    4/1991
JP    H08229792 A    9/1996
JP    H08327807 A    12/1996
JP    H09318399 A    12/1997
(Continued)

*Primary Examiner* — Britt D Hanley
(74) *Attorney, Agent, or Firm* — Harness, Dickey & Pierce, P.L.C.

(57) ABSTRACT

A display device for a vehicle includes: a display unit; a light guide plate disposed on a viewing side of the display unit and having translucency; and a light source unit that causes a light source light to enter inside of the light guide plate through an outer peripheral portion of the light guide plate. The light guide plate includes a reflecting portion having a plurality of reflecting elements to reflect the light source light from the light source unit to the viewing side. The reflecting element has a reflective curved surface formed in a curved surface shape to face the outer peripheral portion where the light source light is incident.

17 Claims, 19 Drawing Sheets

(56) References Cited

FOREIGN PATENT DOCUMENTS

| | | |
|---|---|---|
| JP | 2000237942 A | 9/2000 |
| JP | 2001162429 A | 6/2001 |
| JP | 2004069729 A | 3/2004 |
| JP | 2010048614 A | 3/2010 |
| JP | 2010091337 A | 4/2010 |
| JP | 2011232717 A | 11/2011 |
| JP | 2013080120 A | 5/2013 |
| JP | 2013205529 A | 10/2013 |
| JP | 2014220208 A | 11/2014 |
| JP | 2016018194 A | 2/2016 |
| JP | 2016057101 A | 4/2016 |
| JP | 2016114423 A | 6/2016 |
| JP | 2016121890 A | 7/2016 |
| JP | 2016121891 A | 7/2016 |
| JP | 2016122002 A | 7/2016 |
| WO | WO-2018088024 A1 | 5/2018 |

\* cited by examiner

US 11,073,650 B2

DISPLAY DEVICE FOR VEHICLES

CROSS REFERENCE TO RELATED APPLICATIONS

This application is a continuation application of International Patent Application No. PCT/JP2017/033184 filed on Sep. 14, 2017, which designated the United States and claims the benefit of priority from based on Japanese Patent Application No. 2016-218280 filed on Nov. 8, 2016 and Japanese Patent Application No. 2017-089369 filed on Apr. 28, 2017. The entire disclosures of all of the above applications are incorporated herein by reference.

TECHNICAL FIELD

The present disclosure relates to a display device mounted on a vehicle.

BACKGROUND

Conventionally, a display device for a vehicle is known, which includes a display unit, a light guide plate, and a light source unit. The display unit performs display. The light guide plate is disposed on a viewing side of the display unit, and is formed in a plate shape having translucency.

SUMMARY

In one aspect of the present disclosure, a display device for vehicles includes: a display unit for displaying; a light guide plate disposed on a viewing side of the display unit and formed in a plate shape having translucency; and a light source unit that causes a light source light to enter inside of the light guide plate through an outer peripheral portion of the light guide plate. The light guide plate includes a reflecting portion having a plurality of reflecting elements to reflect the light source light from the light source unit to the viewing side, and the reflecting element has a reflective curved surface formed in a curved surface shape to face the outer peripheral portion where the light source light is incident.

DETAILED DESCRIPTION

Figure 1:
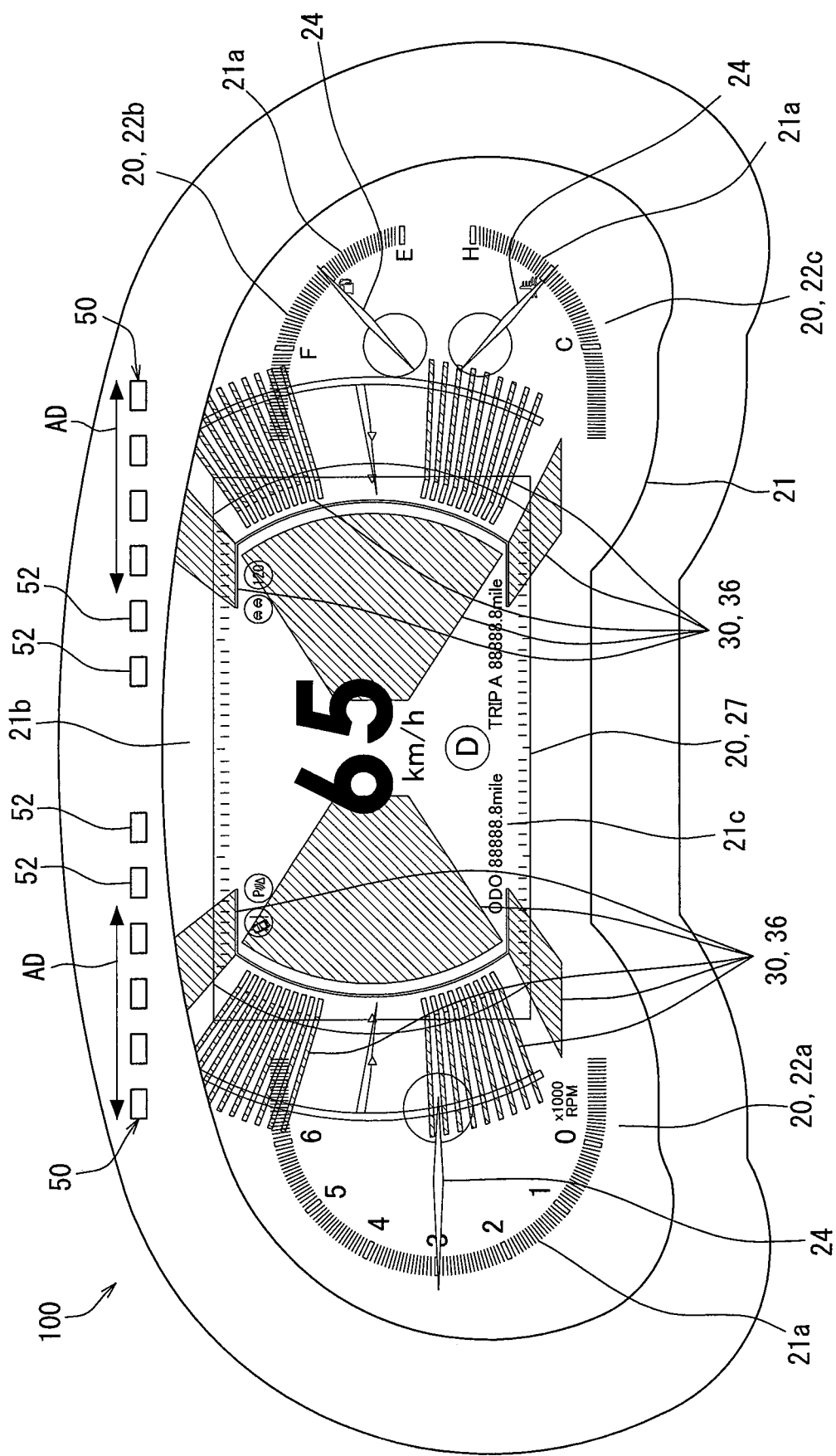
FIG. 1 is a front view illustrating a display device for vehicles according to a first embodiment.

To begin with, examples of relevant techniques will be described.

The light source unit has plural light emitting elements to emit light source light in illumination ranges of the light guide plate offset in the extending direction of the light guide plate. The light guide plate includes a reflecting portion having plural reflecting elements for reflecting the light source light from the light source unit to the viewing side. Each of the reflecting elements has a reflection plane formed in a planar shape to face the outer peripheral part where the light source light is incident. The reflection plane extends in a direction in which the illumination ranges of the light emitting elements are offset.

In such a device, it is possible to visually recognize a pattern design at a position where the reflecting portion is disposed by reflecting the light source light, while a display on the display unit is visually recognized through the light guide plate.

It can be said that the device includes a light source unit and a translucent display plate. The translucent display plate has translucent property and is made of a plate having a front plate face facing the viewing side and a back plate face facing a side opposite to the viewing side, to introduce light source light from the light source unit inside through the outer peripheral portion.

A reflective display portion provided on the translucent display plate displays a pattern design by appropriate arrangement of plural reflecting elements. Each of the reflecting elements is recessed from the back plate face, and has a reflective surface for reflecting the light source light introduced into the translucent display plate to the viewing side. The reflective surface reflects the light source light to the viewing side, so that the pattern design can be displayed.

Each of the reflecting elements has one inclined surface, as the reflective surface, which is inclined to be apart from the outer peripheral portion into which the light source light is introduced as going from the back plate face to the front plate face.

The following issue has been found in the configuration of the reflecting portion. Specifically, when a display light from the display unit passes through the light guide plate, there are a path visible without being refracted at the reflection plane and a path visible with being refracted at the reflection plane. When display lights with different paths enter the eye of an occupant of the vehicle, the display on the display unit may be visually recognized as multiple image such as double image in which the display positions are shifted from each other. This is because the image of the display light reaches the eye of the occupant without much disturbance, due to the refraction of the display light by the flat reflection plane.

In addition, each reflecting element is defined of one reflective surface having common orientation in the reflective display portion. However, in the case of one reflecting surface, even when a viewer changes the viewing position, the brightness of the reflective display portion is simply changed, and the glittering effect cannot be felt by the viewer, which is not attractive.

The present disclosure provides a display device with improved appearance for a viewer in a vehicle.

In one aspect of the present disclosure, a display device for vehicles includes:

a display unit for displaying;

a light guide plate disposed on a viewing side of the display unit and formed in a plate shape having translucency; and a light source unit that causes a light source light to enter inside of the light guide plate through an outer peripheral portion of the light guide plate.

The light guide plate includes a reflecting portion having a plurality of reflecting elements to reflect the light source light from the light source unit to the viewing side, and the reflecting element has a reflective curved surface formed in a curved surface shape to face the outer peripheral portion where the light source light is incident.

Accordingly, the reflecting portion having the reflecting elements to reflect the light source light from the light source unit to the viewing side is provided on the light guide plate, and the reflective curved surface of the reflecting element faces the outer peripheral portion where the light source unit is incident. The reflective curved surface is formed in the curved surface shape. In case where the display light from the display unit passes through the light guide plate to the viewing side, when a part of the display light is refracted by the reflective curved surface, the display light is deflected (for example, diffused). In contrast to an image formed by the display light transmitted through the light guide plate without being deflected, a display light deflected by the refraction at the reflective curved surface is difficult to present as multiple image (for example, double image). Therefore, the appearance of the display unit becomes good.

As a factor hindering a good appearance, when a light source light is reflected on a planar reflection plane extending in a direction in which the illumination ranges are shifted, a path of the light source light from one light emitting element to the eye is uniquely determined within a narrow range. For this reason, it is visually recognized that the light source light is reflected only by a specific position in the reflecting portion. More specifically, a striped luminance unevenness corresponding to the arrangement interval of the light emitting elements is visually recognized.

In contrast, according to one aspect of the present disclosure, the light source unit includes the plural light emitting elements to emit light source light in illumination ranges of the light guide plate partially offset from each other, and the reflective curved surface has a curvature at least in the offset direction.

Accordingly, when the light source light from the light source unit is reflected, the light source light from one light emitting element can be reflected by one reflective curved surface in various directions. In addition, since the reflective curved surface has a curvature in the offset direction of the illumination range, the light source light from other light emitting elements can be reflected to reach the eye of an occupant of the vehicle, without being limited to a corresponding single light emitting element. Since various paths are realized with respect to the light source light, it is visually recognized that the light source light is reflected by each position of the reflecting portion, to suppress the striped luminance unevenness due to the arrangement interval of the light emitting elements. Therefore, the appearance of the reflecting portion becomes good.

As described above, it is possible to provide a display device for vehicles, that is excellent both in the appearance of the display unit and the appearance of the reflecting portion.

In one aspect of the present disclosure, a display device for vehicles includes: a light source unit that provides a light source light; and a translucent display plate made of a translucent plate having a front plate surface facing a viewing side, and a back plate surface facing a side opposite to the viewing side.

The translucent display plate introduces the light source light inside through an outer peripheral portion.

The translucent display plate includes: a plurality of reflecting elements recessed from the back plate surface and having a reflective surface to reflect the light source light introduced into the translucent display plate to the viewing side; and a reflective display portion to display a pattern design by an arrangement of the reflecting elements.

The reflective display portion includes a composite reflection element having two inclined surfaces with opposite orientations and separated from the outer peripheral portion as going from the back plate surface to the front plate surface, to reflect the light source light, as the reflective surface of the reflecting elements.

Accordingly, the two inclined surfaces of the composite reflective surface of the composite reflection element are different in the orientation while the two inclined surfaces are inclined to separate from the outer periphery portion where the light source light is introduced as going from the back plate surface toward the front plate surface. In case where the light source light is reflected to the viewing side by the composite reflection element, when the viewer changes the viewing position, the change in the brightness is different between the two inclined surfaces. Thus, the pattern design of the reflective display portion including the composite reflection element can be recognized as shining brilliantly. Since the glittering display of a pattern design is realized by the reflective display portion, it is possible to provide a display device with improved appearance for a viewer in a vehicle.

A first embodiment will be described with reference to the drawings.

As shown in FIG. 1, a vehicle display device 100 according to a first embodiment is mounted on a vehicle, and is installed on an instrument panel facing a seat on which an occupant who visually recognizes the device 100 is seated. In the vehicle, an ellipsoidal Eyellipse ELP (see also FIG. 3) can be specified. The eyellipse ELP is set in a space on the viewing side of the display device 100 based on an eye range that statistically represents the distribution of the position of the driver's eye as an occupant of the vehicle (for details, refer to JISD0021: 1998). As the eyellipse ELP, in many cases, an eyellipse from 90th to 99th percentile, such as 90th percentile eyellipse, 95th percentile eyellipse, 99th percentile eyellipse, is employed. In the present embodiment, 99th percentile eyellipses is adopted.

In the present embodiment, a lower side of the vehicle indicates a gravity direction relative to the vehicle on the horizontal plane. An upper side of the vehicle indicates the opposite direction to the lower side of the vehicle.

Figure 2:
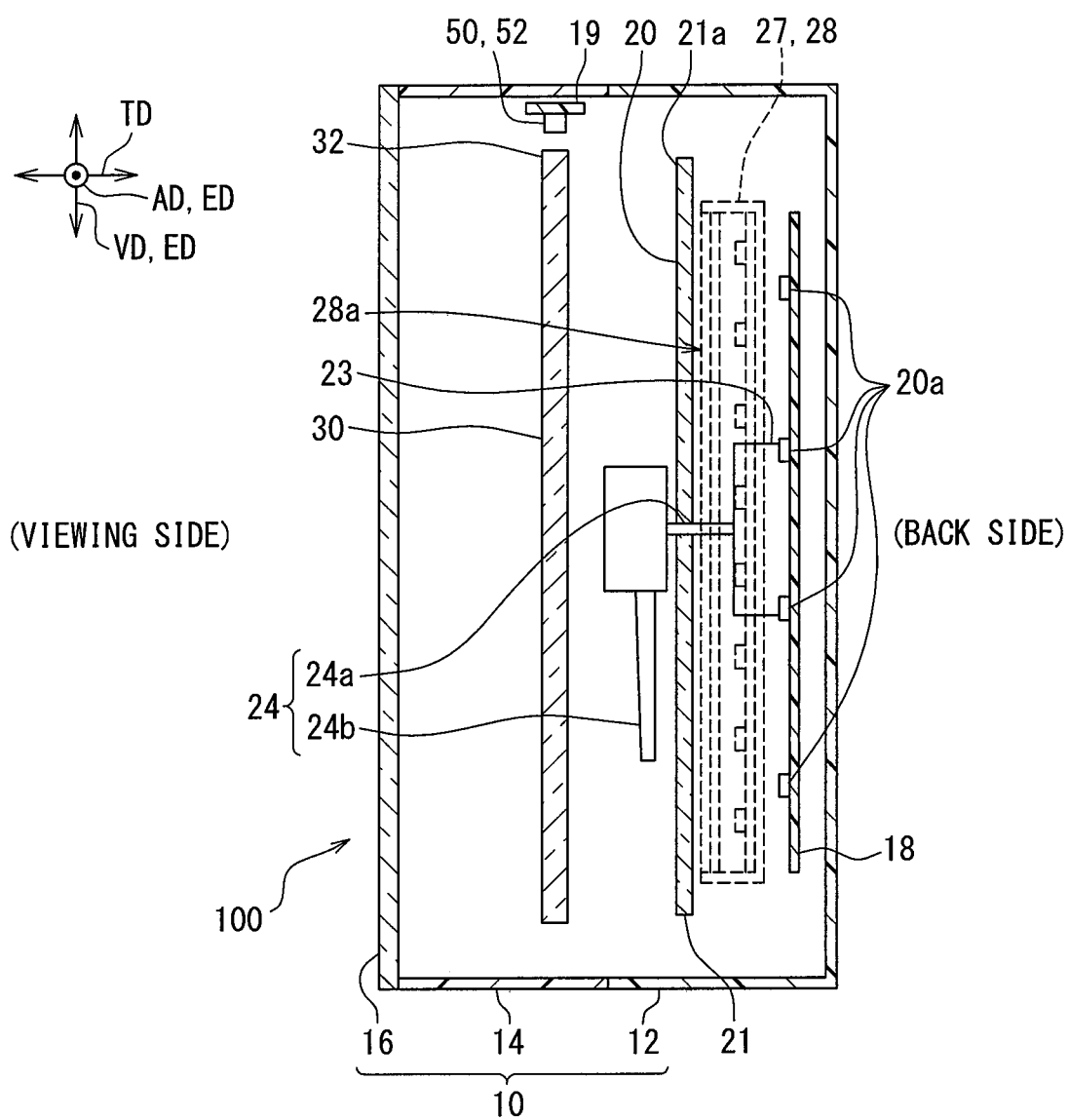
FIG. 2 is a schematic cross-sectional view of the display device of the first embodiment.

As shown in FIG. 2, the vehicle display device 100 includes a case portion 10, a display unit 20, a light guide plate 30, and a light source unit 50 for the light guide plate. The case portion 10 includes a rear case 12 and a window plate 14 each having a light shielding property, and a light transmissive plate 16 disposed the closest to the viewing side in the device 100 and has a light transmission property. The light transmissive plate 16 is formed in a plate-shape and made of a semi-translucent resin such as colored acrylic resin. The transmittance of the light transmissive plate 16 is set to about 30% by smoke-like coloring, but may be set to an arbitrary value more than or equal to 30%.

The display unit 20 displays a state of the vehicle with the use of a display plate 21. The display plate 21 is also generally called a dial and is disposed behind the light guide plate 30 on the side opposite to the viewing side. The display plate 21 is formed in a flat plate shape by partially applying semi-translucent or light-shielding print on the viewing side surface of a base material made of, for example, a light transmissive synthetic resin. The printing may be replaced with coating.

The display unit 20 includes multiple mechanical display units 22a, 22b, 22c and an image display portion 27. In the present embodiment, when viewing from the viewing side, the mechanical display unit 22a is arranged on the left side of the display plate 21, the image display portion 27 is arranged in the central portion of the display plate 21, the mechanical display unit 22b is disposed on the upper right side of the display plate 21, and the mechanical display unit 22c is disposed on the lower right side of the display plate 21.

In this example, since the three mechanical display units 22a, 22b, 22c have the same configuration as each other, the left mechanical display unit 22a will be described as a representative. The mechanical display unit 22a has a stepping motor 23, and a pointer 24. The stepping motor 23 is held on a main circuit board 18 disposed behind the display plate 21.

The pointer 24 integrally includes a coupling portion 24a and an indicating portion 24b. The coupling portion 24a is disposed through a through hole provided in the display plate 21, and is coupled to a rotation shaft of the stepping motor 23. The indicating portion 24b is disposed between the display plate 21 and the light guide plate 30, and has a needle shape. The pointer 24 rotates in accordance with an output of the stepping motor 23, and a state of the vehicle is displayed by pointing a tick 21a disposed in a partial ring shape on the display plate 21.

In the present embodiment, the ticks 21a are configured by scales and numerals. Those scales and numerals are surrounded by light shielding printing on the display plate 21 and formed into a contour by semi-translucent printing. Then, a light source unit 20a mounted on the main circuit board 18 for the tick illuminates the ticks 21a from behind, so that display light is emitted from the ticks 21a toward the viewing side.

In the present embodiment, the left mechanical display unit 22a displays an engine speed as the state of the vehicle. The mechanical display unit 22b on the upper right side displays the remaining fuel amount as the state of the vehicle. The mechanical display unit 22c on the lower right side displays the water temperature of the engine cooling water as the state of the vehicle.

The image display portion 27 includes a liquid crystal display 28 disposed on the back side of the display plate 21 and in close to the display plate 21. The liquid crystal display 28 of the present embodiment is a liquid crystal panel using thin film transistors (Thin Film Transistor, TFTs) and employs an active matrix liquid crystal display panel formed of plural liquid crystal pixels arranged two-dimensionally. The liquid crystal display 28 displays an image by emitting display light from a rectangular display surface 28a to the viewing side.

Further, as shown in FIG. 1, the display plate 21 has a light transmitting portion 21c at a position overlapping with the display surface 28a of the image display portion 27. The light transmitting portion 21c has a light transmitting property by semi-translucent printing or not performing a printing, and is arranged with a size slightly smaller than the display surface 28a. The light transmitting portion 21c is surrounded by a light-shielding portion 21b having light-shielding properties by printing, thereby the outline is formed in a rectangular shape. In this way, the display light from the display surface 28a passes through the light transmitting portion 21c.

Figure 3:
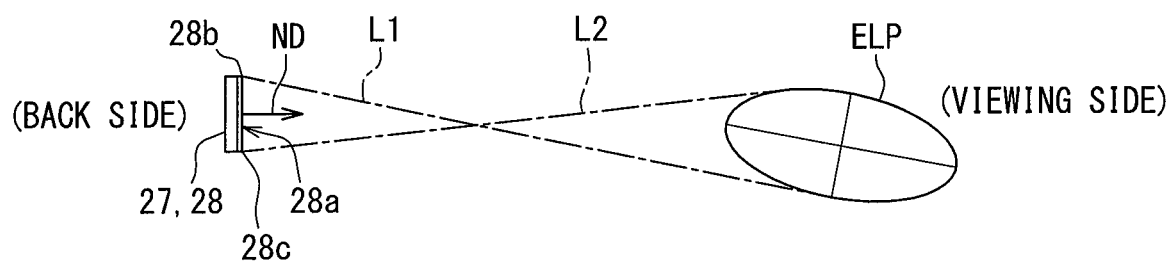
FIG. 3 is a diagram for explaining a relationship between an image display unit and an eyellipse in the first embodiment.

Further, as shown in FIG. 3, in the present embodiment, a straight line L1 passes through an upper end 28b of the display surface 28a and circumscribes the lower side of the 99th percentile eyellipse ELP, and forms an angle of about 11 degrees with a vertical direction ND with respect to the display surface 28a. Likewise, a straight line L2 passes through a lower end 28c of the display surface 28a and circumscribes the upper side of the 99th percentile eyellipse ELP, and forms an angle of about 6 degrees with the vertical direction ND. That is, the straight line L1 forms a larger angle with respect to the vertical direction ND than the straight line L2.

As shown in FIG. 2, the light guide plate 30 is formed in a flat plate shape and made of, for example, synthetic resin having a light transmissive property. The light guide plate 30 is disposed on the viewing side of the display unit 20 and substantially parallel to the display plate 21. Therefore, the arrangement direction ED of the light guide plate 30 is along the extending direction of the display surface 28a and the arrangement direction of the display plate 21. The thickness direction TD of the light guide plate 30 is along the vertical direction ND and the thickness direction of the display plate 21. It is to be noted that the arrangement direction ED of the present embodiment includes a direction perpendicular to the paper surface of FIG. 2 and a direction along the up-down direction of the vehicle on the paper surface, to indicate each direction along the light guide plate 30. The thickness direction TD of the present embodiment substantially coincides with a direction perpendicular to a surface of the light guide plate 30 having the largest area.

The light source unit 50 for the light guide plate includes multiple light emitting elements 52 that emit light source light. In the present embodiment, the light emitting element 52 is a light emitting diode mounted on a circuit board 19 for the light source, and emits light by being connected to a power supply through a control circuit. Each of the light emitting elements 52 is provided to be switchable on or off, and emits light of the same color with each other. The light emitting elements 52 are arranged along a side of the outer peripheral portion 32 of the light guide plate 30, and oppose to a side surface of the outer peripheral portion 32. The light emitting elements 52 are arranged in the arrangement direction AD along the arrangement direction ED of the light guide plate 30, and spaced from each other by a predetermined distance in the arrangement direction AD. The light source light enters inside of the light guide plate 30 from each light emitting element 52 of the light source unit 50 through the outer peripheral portion 32 of the light guide plate 30. In this embodiment, as shown in FIG. 1, the light emitting elements 52 are arranged at two positions on the right and left sides. along the upper side of the outer peripheral portion 32 of the light guide plate 30. Light is emitted toward the outer peripheral portion on the lower side so that the light source light travels from the upper side toward the lower side.

Figure 4:
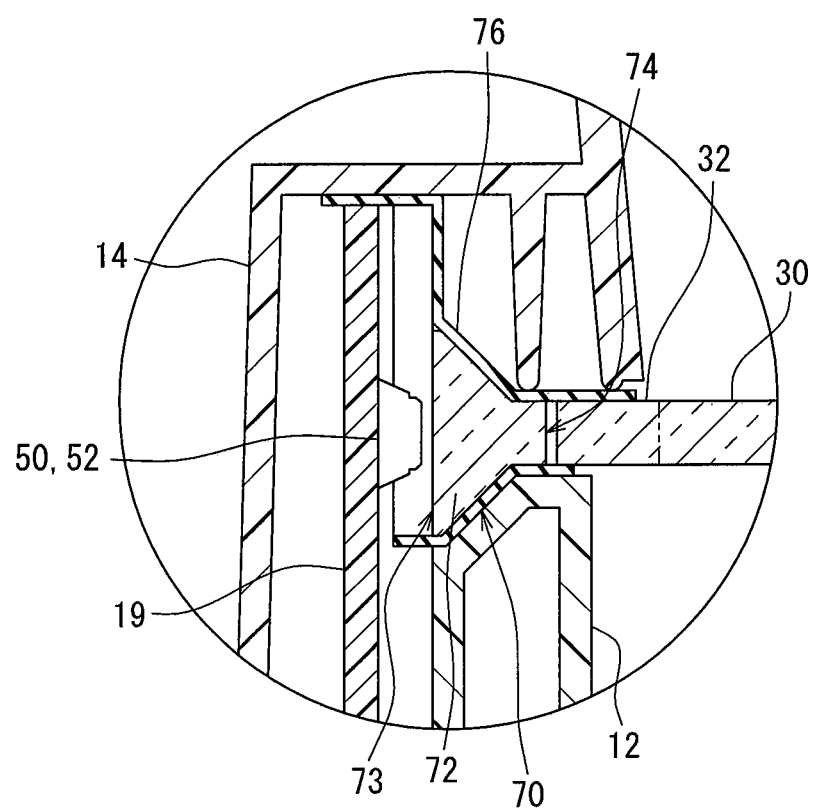
FIG. 4 is a cross-sectional view illustrating an outer edge member.

An outer edge member 70, as shown in FIG. 4, may be provided between the light emitting element 52 and the outer peripheral portion 32 of the light guide plate 30. The outer edge member 70 integrally includes an outer peripheral light guide portion 72 and a light shielding portion 76 by two-color molding. The outer peripheral light guide portion 72 is made of, for example, a synthetic resin having a light transmissive property to be able to guide the light source light. The outer peripheral light guide portion 72 has a plate facing surface 74 facing the outer peripheral portion 32 of the light guide plate 30, and a light source facing surface 73 facing the light emitting element 52. Each of the light source facing surface 73 and the plate facing surface 74 is formed in a smooth planar shape.

The light shielding portion 76 is made of, for example, an elastomer having a light shielding property, and has a cylindrical shape surrounding a part of the outer peripheral light guide portion 72 except for the facing surfaces 73 and 74. As a result, when the light source light emitted by the light emitting element 52 is guided by the outer peripheral light guide portion 72, the light source light is less likely to leak to the outside of the light shielding portion 76. The light shielding portion 76 extends toward the light guide plate 30 than the plate facing surface 74.

The outer edge member 70 is held between the rear case 12 and the window plate 14. Further, the outer edge member 70 holds the light guide plate 30 between the ends of the light shielding portion 76 adjacent to the light guide plate 30. The flexibility of the elastomer of the light shielding portion 76 reduces abnormal noises such as collision noises between the light guide plate 30 and the case portion 10, which may occur in response to vibration of the vehicle.

The light source lights from the light emitting elements 52 that enter the inside of the light guide plate 30 through the outer peripheral portion 32 illuminate illumination ranges partially shifted from each other in the extending direction ED. In this embodiment, since the light source light emitted from the light emitting elements 52 arranged in the arrangement direction AD directly illuminates the corresponding illumination range, the illumination ranges are offset in the arrangement direction AD. In other words, the direction in which the illumination ranges are offset substantially coincides with the arrangement direction AD.

Figure 5:
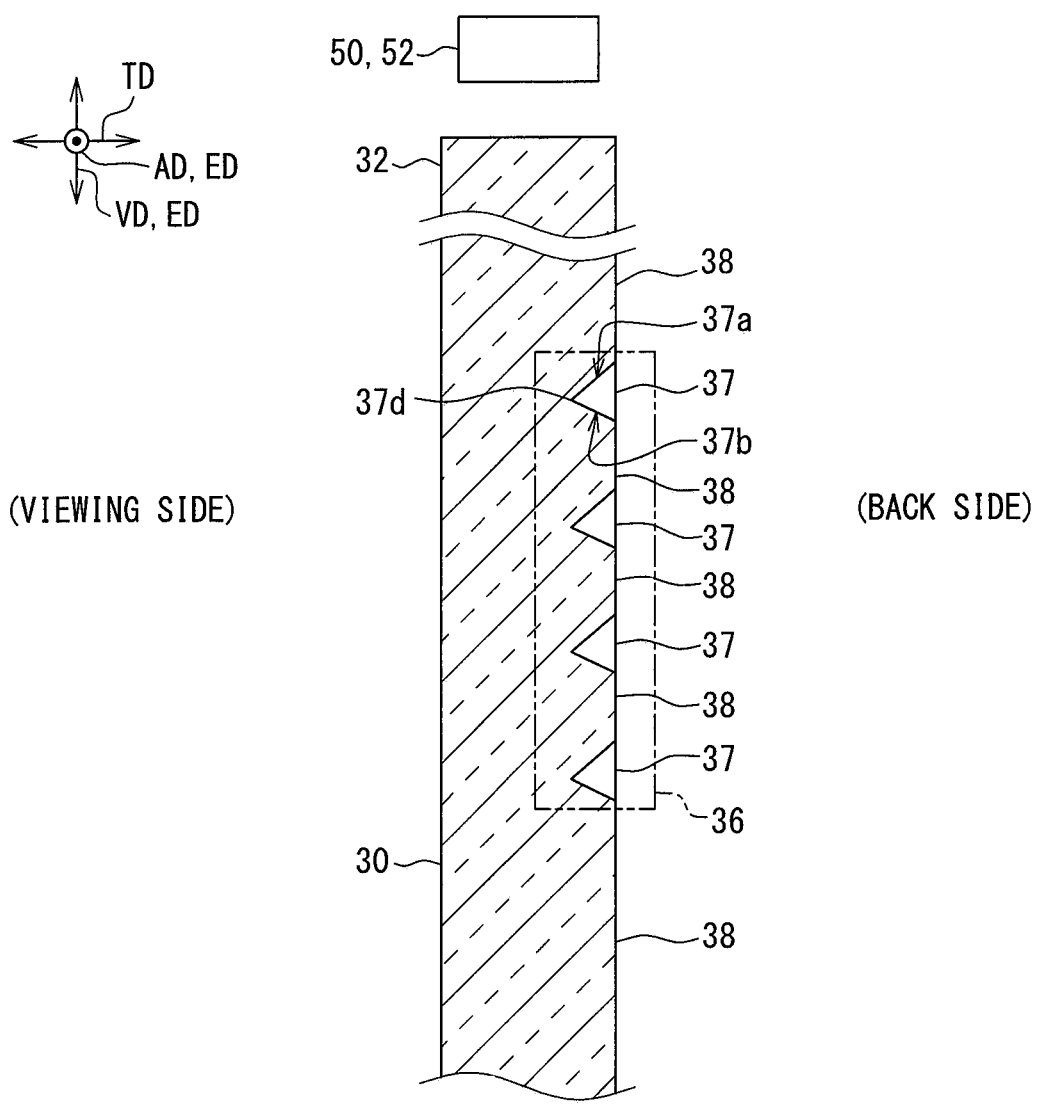
FIG. 5 is a schematic cross-sectional view illustrating a light guide plate in the first embodiment.

As shown in FIGS. 1 and 5, the light guide plate 30 has a reflecting portion 36 in a partial region of the light guide plate 30. In the present embodiment, the reflecting portion 36 is arranged corresponding to the light emitting elements 52 divided into the two positions on the left and right. In FIG. 1, the reflecting portion 36 is indicated by slanting hatching.

Figure 6:
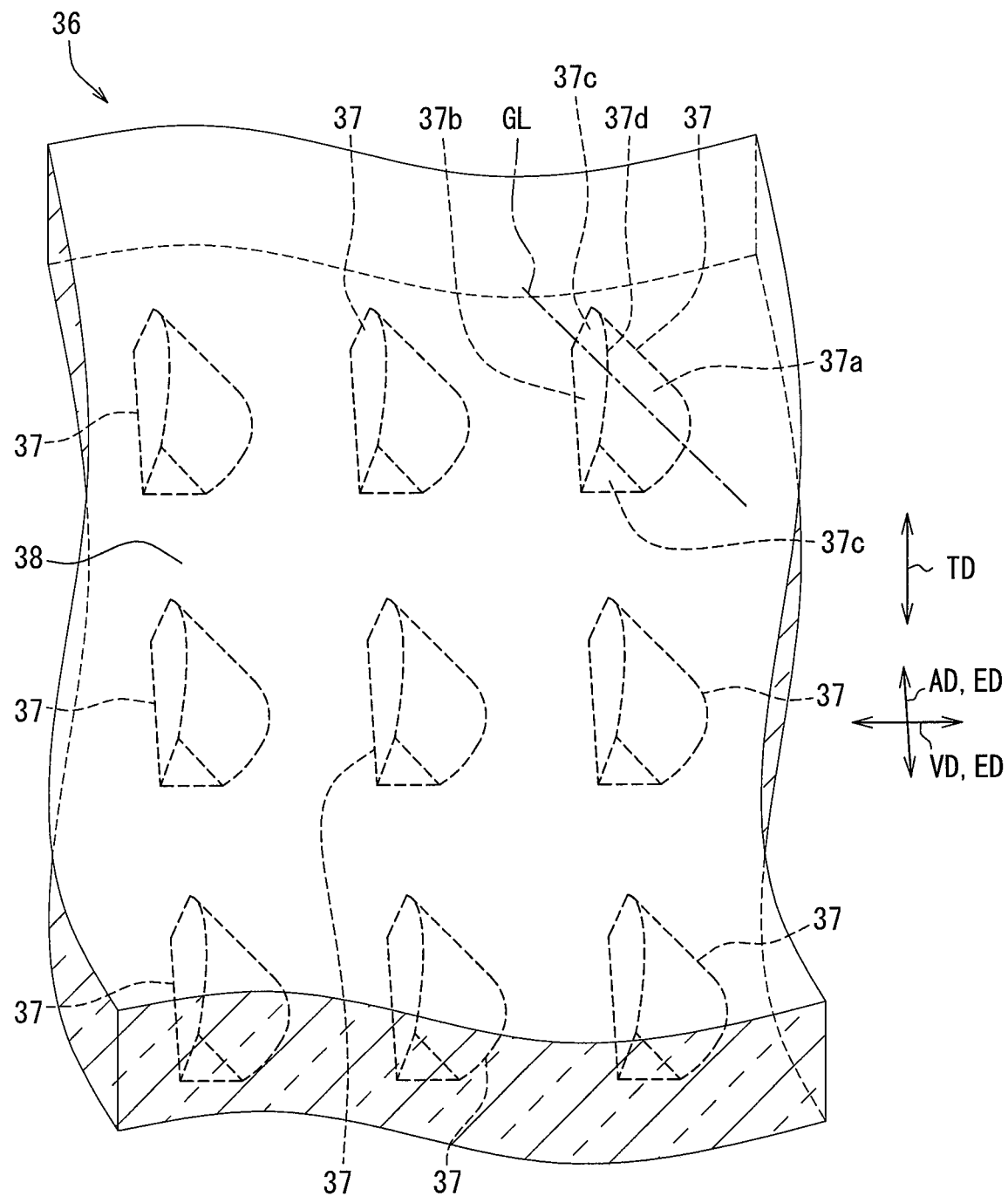
FIG. 6 is a perspective view illustrating a reflecting element in the first embodiment.

As shown in FIG. 6, the reflecting portion 36 includes plural reflecting elements 37 for reflecting the light source light from the light source unit 50 to the viewing side, and the reflecting elements 37 are two-dimensionally arranged in the arranging direction ED. Each of the reflecting elements 37 is formed in a concave hole shape recessed from the back side of the light guide plate 30 inward of the light guide plate 30. Each reflecting element 37 has a reflective curved surface 37a, a reflective back surface 37b, and two side surfaces 37c. The reflecting element 37 has a ridge portion 37d having a ridge line shape, as a boundary portion between the reflective curved surface 37a and the reflective back surface 37b at each recessed portion of the reflecting element 37. The recess size of the reflecting element 37 defined as a distance from the flat portion 38 of the light guide plate 30 to the most recessed position is preferably set in the range of 5 to 20 µm.

The reflective curved surface 37a is oriented to the outer peripheral portion 33 on which the light source light is incident, of the reflecting element 37. In particular, the reflective curved surface 37a of the present embodiment is arranged to have orientation facing the light source unit 50. The reflective curved surface 37a is formed into a curved surface recessed into the light guide plate 30. The reflective curved surface 37a has a curvature at least in a direction in which the illumination ranges of the light emitting elements 52 are offset (in the present embodiment, substantially coincides with the arrangement direction). That is, the reflective curved surface 37a is curved along the arrangement direction AD. In the present embodiment, the reflective curved surface 37a is formed in a cylindrical surface shape having a generating line GL along an imaginary plane perpendicular to the arrangement direction AD. In more detail, the generating line GL of the reflective curved surface 37a is inclined with respect to the thickness direction TD of the light guide plate 30 to go away from the light source unit 50 as heading from the back side toward the viewing side. Preferably, an angle formed between the generating line GL and the thickness direction TD is set in the range of 39 to 45 degrees. In the present embodiment, the angle is set to about 42 degrees slightly smaller than 45 degrees. In the present embodiment, the curvature radius of the reflective curved surface 37a in the direction perpendicular to the generating line GL is set to about 100 μm.

The reflective back surface 37b is disposed to face a side opposite to the reflective curved surface 37a through the ridge portion 37d, so that the reflective back surface 37b and the reflective curved surface 37a are arranged back to back. The reflective back surface 37b is formed in a plane shape inclined to the thickness direction TD of the light guide plate 30 by, for example, 25 degrees.

The two side surfaces 37c are disposed between the side end of the reflective curved surface 37a and the side end of the reflective back surface 37b. Each of the side surfaces 37c intersects the arrangement direction AD of the light emitting element 52. More strictly, each of the side surfaces 37c is perpendicular to the arrangement direction AD of the light emitting element 52, and has a planar shape substantially along the above-mentioned imaginary plane. In the present embodiment, the contour of each side surface 37c is triangular due to the shape of the reflective curved surface 37a and the shape of the reflective back surface 37b.

In the reflecting portion 36, the reflecting elements 37 are disposed one by one, being separated from each other, through the flat portion 38 formed flat along the extending direction of the light guide plate 30. The reflecting elements 37 of the present embodiment are arranged in a lattice pattern in two directions, e.g., the arrangement direction AD of the light emitting elements 52 and the vertical direction VD perpendicular to the arrangement direction AD. The width dimension of the reflecting element 37 in the arrangement direction AD is set to 75 μm, for example.

The arrangement pitch in the arrangement direction AD is preferably set in the range of 100 to 200 μm, for example, 150 μm. The arrangement pitch in the vertical direction is preferably set to 60 to 120 μm, for example, 75 μm. In this way, the arrangement pitch of the reflecting elements 37 is set to be sufficiently smaller than the arrangement pitch of the light emitting elements 52.

The reflecting elements 37 of the present embodiment are arranged at a predetermined constant density within the reflecting portion 36, thereby constituting a pattern design, due to the pitch setting. In case where each light emitting element 52 of the light source unit 50 is turned on, the pattern design is displayed when each reflecting element 37 of the reflecting portion 36 reflects the light from the light source unit 50 to the viewing side. When each light emitting element 52 of the light source unit 50 is turned off, the pattern design is not displayed.

More specifically, when each light emitting element 52 of the light source unit 50 is turned on, as described above, the light source light incident from the outer peripheral portion 32 of the light guide plate 30 to the inside is reflected by the reflective curved surface 37a facing the light source unit 50 in each reflecting element 37. Depending on the shape and orientation of the reflective curved surface 37a, as shown in FIG. 5, most of the light reflected by the reflective curved surface 37a is directed to the inside of the eyellipse ELP on the viewing side, so as to be visually recognized as a pattern design.

As the density of the reflecting elements 37 is higher, the amount of reflected light of the light source light increases, so that the pattern design can be displayed with high luminance. However, as a contrary, if the density of the reflecting elements 37 is increased, there is a possibility that the reflecting portion 36 is perceived as whitish even when the light emitting elements 52 of the light source unit 50 are turned off.

The density of the reflecting elements 37 is obtained by dividing the area occupied by the reflecting elements 37 in the reflecting portion 36 by the total area of the reflecting portion 36 (that is, the sum of the area occupied by the reflecting elements 37 and the area occupied by the flat portion 38 in the reflecting portion 36). According to experiments conducted by the present inventors, in case where the density of the reflecting elements 37 is 7% and 9%, when each of the light emitting elements 52 of the light source unit 50 is turned off, the light guide plate 30 is transparent. In the case of 12%, the transparency of the light guide plate 30 could not be obtained. Therefore, the transparency limit at which the light guide plate 30 is recognized as a transparent plate is considered to be 10%. Therefore, it can be said that it is preferable that the density of the reflection elements 37 is set to 9%.

Figure 7:
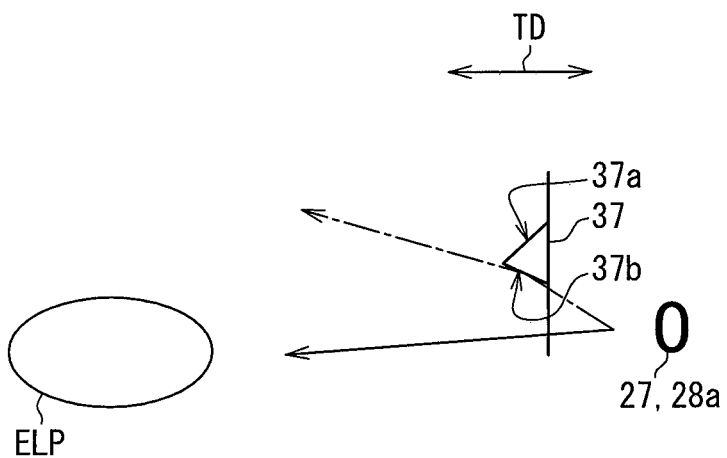
FIG. 7 is a view for explaining a reflection of display light by a reflective back surface in the first embodiment.

Further, in the present embodiment, the reflecting portion 36 is disposed to include a portion overlapping with the image display portion 27 of the light guide plate 30 in the thickness direction TD. Therefore, as shown in FIG. 7, the display light emitted from one pixel on the display surface 28a of the image display portion 27 is incident on the reflecting portion 36 from the back side of the light guide plate 30. Since the light guide plate 30 has translucency, the display light passing through the flat portion 38 of the light guide plate 30 is directed into the eyellipse ELP and can be imaged on the eye of the occupant.

Figure 8:
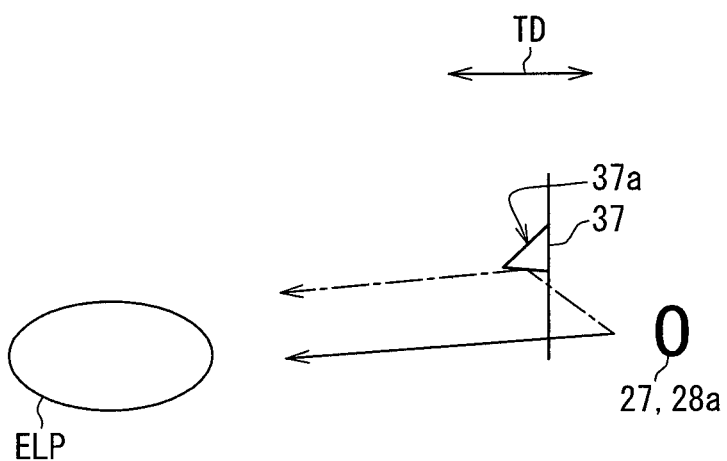
FIG. 8 is a view for explaining a case where the inclination angle of the reflective back surface is reduced.
Figure 9:
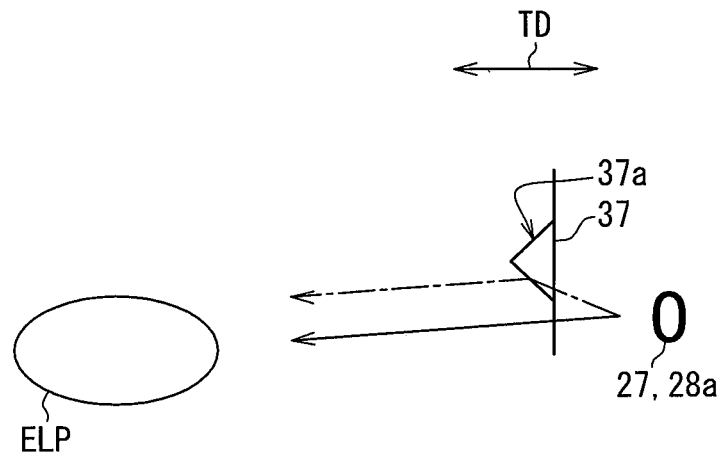
FIG. 9 is a view for explaining a case where the inclination angle of the reflective back surface is increased.

The display light entering the reflective back surface 37b of the reflecting element 37 has a higher proportion entering the reflective back surface 37b from the medium side of the light guide plate 30, due to the setting of the inclination angle (25 degrees). The display light entering the reflective back surface 37b of the reflecting element 37 is directed outside the eyellipse ELP by being reflected by the reflective back surface 37b toward the medium side of the light guide plate 30. As shown in FIG. 8, if the inclination angle with respect to the thickness direction TD is made smaller than the above set value, the traveling direction of the display light after reflected by the reflective back surface 37b approaches the thickness direction TD, and the display light will be directed into the eyellipse ELP. As shown in FIG. 9, if the inclination angle is made larger than the above set value, the proportion of the display light incident on the reflective back surface 37b from the outside of the light guide plate 30 increases. In this case, the proportion directed into the eyellipse ELP increases, by directly passing through the reflective back surface 37b to the viewing side, compared with a case where a light is incident from the medium side. At this time, the display light refracted by the reflective back surface 37b has different imaging position from the display light directed to the inside of the eyellipse ELP through the flat portion 38. Therefore, in the case of FIG. 9, a double image is visually recognized.

Figure 10:
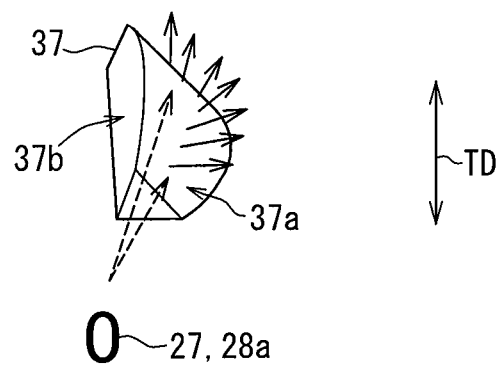
FIG. 10 is a view for explaining a refraction of display light by a reflective curved surface in the first embodiment.

On the other hand, since the reflective curved surface 37a has the function of directing the light source light to the eyellipse ELP, the display light is incident on the reflective curved surface 37a of the reflection element 37 from the outside of the light guide plate 30, while the inclination angle cannot be set small like the reflective back surface 37b. In this case, a generation of double image is concerned. However, in the present embodiment, the reflective curved surface 37a is formed in a curved surface shape, in particular, in a cylindrical surface shape recessed inward of the light guide plate 30. Therefore, as shown in FIG. 10, when the display light is refracted by the reflective curved surface 37a, the display light is diffused in each direction. Therefore, even while the display light transmitted through the reflective curved surface 37a is directed into the eyellipse ELP, it is hard to form an image.

The operation and effects of the first embodiment will be described below.

According to the first embodiment, the light guide plate 30 includes the reflecting portion 36 in which the plural reflecting elements 37 are arranged in the arranging direction ED to reflect the light source light from the light source unit 50 to the viewing side, and the reflective curved surface 37a of the reflecting element 37 faces the light source unit 50. The reflective curved surface 37a is formed in a curved surface shape. In this way, in case where the display light from the display unit 20 passes through the light guide plate 30 to the viewing side, when a part of the display light is refracted by the reflective curved surface 37a, the display light is deflected (for example, diffused). In contrast to an image formed by the display light transmitted through the light guide plate 30 without undergoing the deflection action, the display light that has undergone the deflection action by refraction at the reflective curved surface 37a is not imaged and not visually recognized as a multiple image (such as a double image). Therefore, the appearance of the display unit 20 becomes good.

According to the first embodiment, in the reflection of the light source light from the light source unit 50, the light source light from one light emitting element 52 can be reflected by one reflective curved surface 37a in various directions. Further, since the reflective curved surface 37a has a curvature in a direction in which the illumination ranges are offset, the light source light from the other light emitting element 52 can be reflected to reach the eye of the occupant of the vehicle, without being limited to the light emitting element 52 which faces directly in front of the one reflective curved surface 37a. Since various paths are realized with respect to the light source light, the light source light is visually recognized to be reflected from each position of the reflecting portion 36 to suppress striped brightness unevenness corresponding to the arrangement interval of the light emitting elements 52. Therefore, the appearance of the reflecting portion 36 becomes good.

As described above, it is possible to provide the display device 100 which is good both in the appearance of the display unit 20 and the appearance of the reflecting portion 36.

According to the first embodiment, since the reflecting element 37 is formed in a concave hole shape recessed inward from the back side of the light guide plate 30, the reflecting element 37 cannot to be visually recognized when the light source unit 50 is turned off, and the appearance becomes favorable.

According to the first embodiment, the reflective curved surface 37a is formed into a curved surface recessed inward of the light guide plate 30. Therefore, since the display light from the display unit 20 is surely diffused due to the refraction at the reflective curved surface 37a, it is difficult to form a multiple image (for example, a double image). On the other hand, since the light source light from one light emitting element 52 is reflected by the reflective curved surface 37a in various directions without being focused, luminance unevenness can be surely suppressed.

According to the first embodiment, the generating line GL of the reflective curved surface 37a shaped in cylindrical is arranged along an imaginary plane perpendicular to the arrangement direction AD. Due to the generating line GL, while the reflective curved surface 37a reflects the light source light in various directions in the cross-section along the arrangement direction AD, it is possible to align the reflecting directions in the cross-section perpendicular to the arrangement direction AD. Therefore, it is possible to reflect the light source light stably and efficiently to the viewing side, so that the occupant of the vehicle can visually recognize the light source light with high brightness.

According to the first embodiment, the reflective back surface 37b is inclined with respect to the thickness direction TD so that the display light reflected by the reflective back surface 37b is directed outside the eyellipse ELP of the vehicle. Due to such inclination, when a part of the display light is reflected on the reflective back surface 37b, since it is directed outside the eyellipse ELP of the vehicle, it hardly reaches the eye of the occupant of the vehicle. Therefore, generation of multiple image (for example, double image) can be suppressed.

According to the first embodiment, each of the reflecting elements 37 spaced from each other via the flat portion 38 has the side surface 37c between the side end of the reflective curved surface 37a and the side end of the reflective back surface 37b to intersect the arrangement direction AD. Due to the side surface 37c, efficient reflection can be performed by the reflective curved surface 37a opposed to the light source unit 50 while the flat portion 38 is reliably secured between the adjacent reflecting elements 37.

Multiple images (for example, double images) and moiré are likely to occur remarkably when the display light from the image display portion 27 passes through the light guide plate 30 through the reflecting portion 36. However, in the reflective curved surface 37a of the first embodiment, it is possible to suppress the occurrence of the multiple images (for example, double image) and moiré, so that good appearance can be kept even if the image display portion 27 is adopted.

Although the first embodiment has been described above, it can be applied to various embodiments and combinations without departing from the gist of the present disclosure.

As a first modification, the image display portion 27 may include, for example, an organic EL display in addition to the liquid crystal display 28.

In a second modification, the density of the reflecting element 37 may be changed depending on places, for example, in a gradation manner, in the reflecting portion 36, such that a pattern design whose luminance changes in a gradation manner may be displayed. Further, the recess dimension of the reflecting element 37 may be changed according to the location, to display a pattern design whose luminance changes in a gradation pattern.

In a third modification, the reflective curved surface 37a may be formed in a curved surface protruding from the inside of the light guide plate 30 to the outside.

In a fourth modification, the reflective curved surface 37a may be formed, for example, in a spherical shape other than the cylindrical surface shape.

In a fifth modification, the side surface 37c may not be provided on the reflection element 37.

As a sixth modification, the patterns formed by the reflecting portion 36 are not limited.

Figure 11:
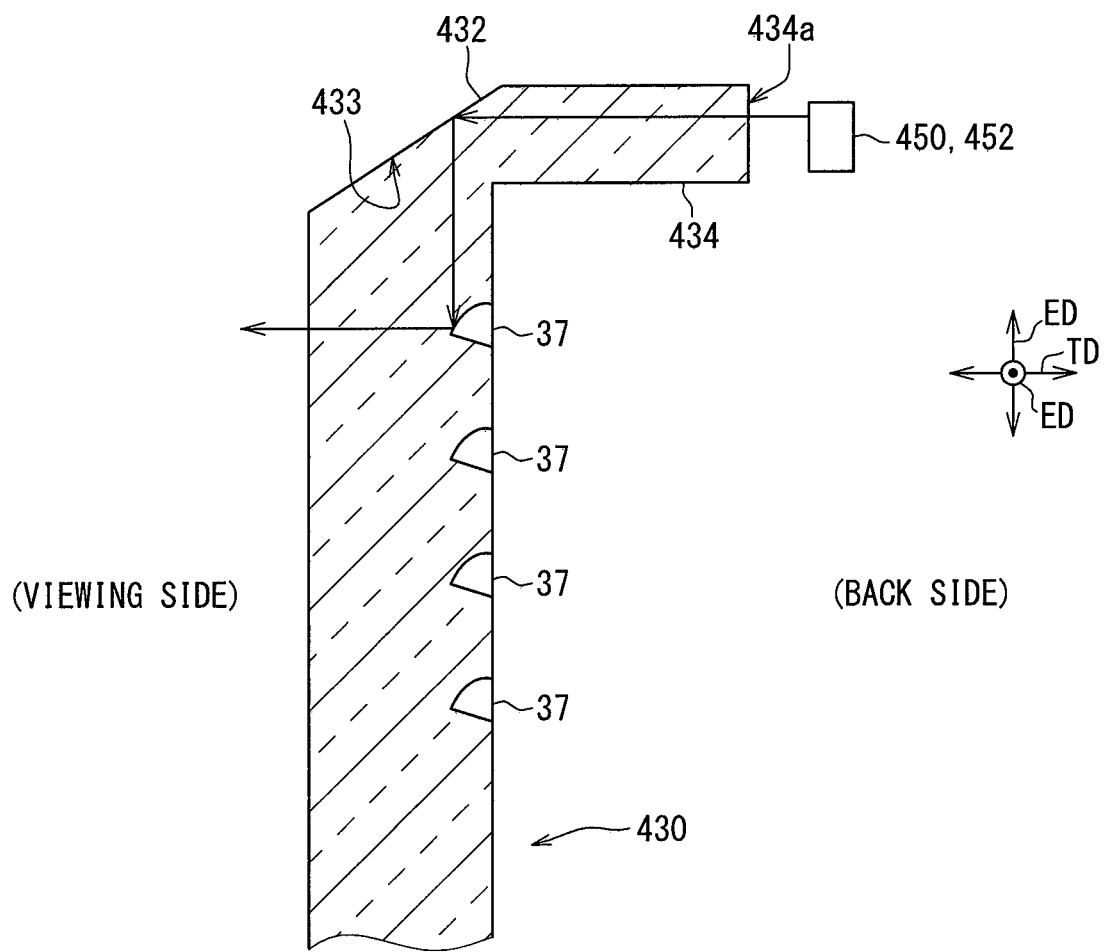
FIG. 11 is a view of a seventh modification of the first embodiment corresponding to FIG. 5.
Figure 12:
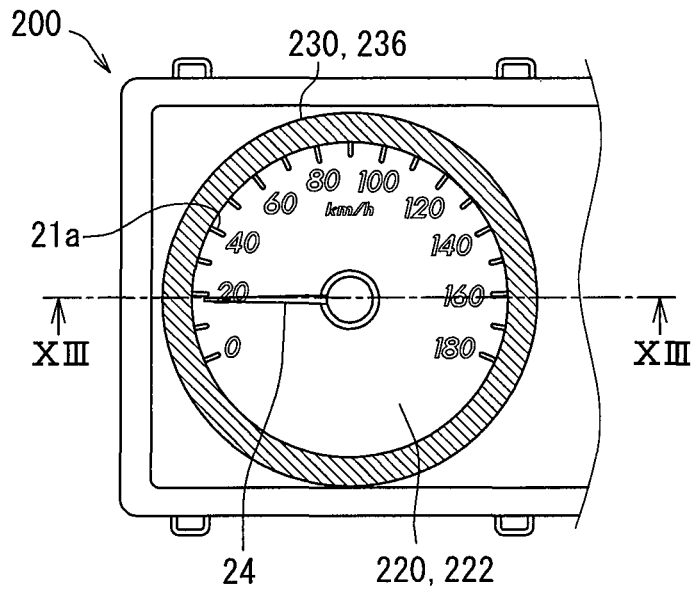
FIG. 12 is a partial front view of a display device for vehicles according to an eighth modification of the first embodiment.
Figure 13:
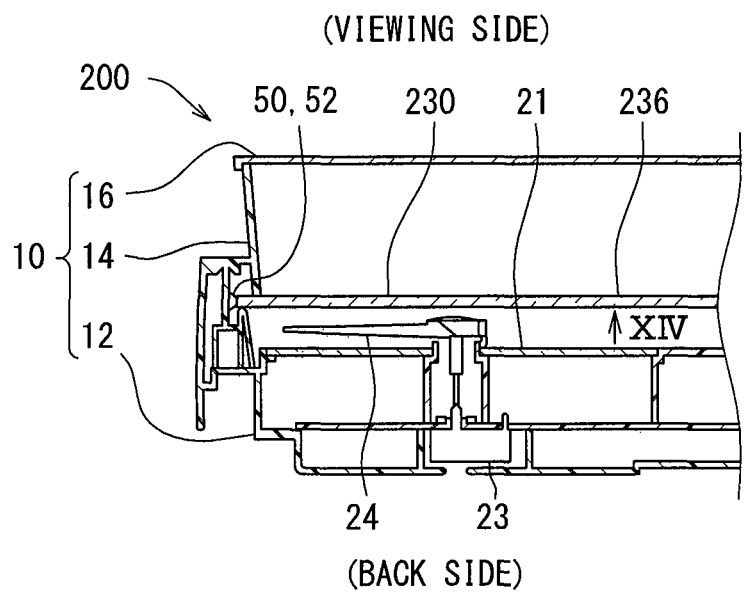
FIG. 13 is a cross-sectional view taken along a line XIII-XIII in FIG. 12.
Figure 14:
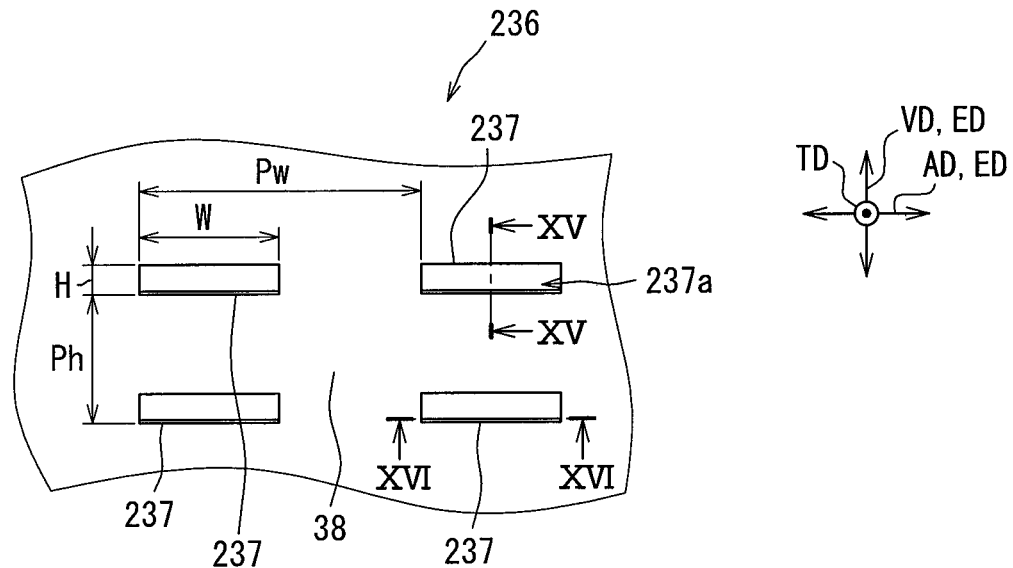
FIG. 14 is an enlarged view of a light guide plate in a direction XIV of FIG. 13.
Figure 15:
FIG. 15 is a cross-sectional view taken along a line XV-XV in FIG. 13.
Figure 16:
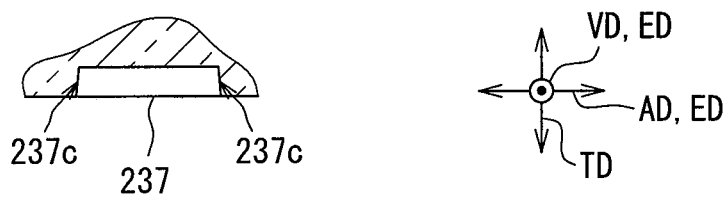
FIG. 16 is a cross-sectional view taken along a line XVI-XVI in FIG. 13.

As a seventh modification, as shown in FIG. 11, the outer peripheral portion 432 of the light guide plate 430 may include a reflection surface 433 provided as a plane inclined toward the back side as going outward, and a light guide portion 434 extending from the reflection surface 433 to the back side. In an example of FIG. 11, the light guide portion 434 has a tip end surface 434a on the back side, and multiple light emitting elements 452 of the light source unit 450 are arrayed to face of the tip end surface 434a. The light source light emitted from the multiple light emitting elements 452 at positions different from each other is guided to the reflection surface 433 by the light guide portion 434, and is further reflected to the inside of the light guide plate 430 by the reflection surface 433. In this manner, the light source lights of the light emitting elements 452, which enter the inside of the light guide plate 430 through the outer peripheral portion 432, illuminate illumination ranges which are partially shifted from each other in the extending direction ED.

An eighth modification provides a vehicle display device 200 as shown in FIGS. 12 to 16. The display unit 220 of the device 200 does not have an image display portion, and has a mechanical display unit 222 similar to that of the first embodiment.

The reflecting portion 236 provides a pattern design in a region of the light guide plate 230 corresponding to the outer periphery of the mechanical display unit 222, annularly arranged over the entire circumference to border the tick 221a in a partial annular shape. As in the first embodiment, the reflecting portion 236 has plural reflecting elements 237 arranged two-dimensionally in the arrangement direction ED. The reflecting element 237 of the eighth modification has a reflection plane 237a, a reflection back face 237b, and two side faces 237c. The reflection back face 237b and the two side faces 237c are the same as those in the first embodiment, but the inclination angle of the reflection back face 237b with respect to the thickness direction TD of the light guide plate 230 is set to, for example, 5 degrees.

The reflection plane 237a is disposed to face the light source unit 50, of the reflecting element 237. The reflection plane 237a is formed in a planar shape that is inclined with respect to the thickness direction TD to separate away from the light source unit 50 as going from the back side toward the viewing side. An angle formed between the reflection plane 237a and the thickness direction TD is preferably set in a range of 39 to 45 degrees, and set at 45 degrees in the eighth modification.

In this shape, the density of the reflecting element 237 can be calculated from the equation of D=W·H/[(Ph+H)·(W+Pw)]. W is the width dimension of the reflection element 237 in the arrangement direction AD. H is the height dimension of the reflection element in the vertical direction VD. Pw is the arrangement pitch in the arrangement direction AD. Ph is the arrangement pitch in the vertical direction VD.

Figure 17A:
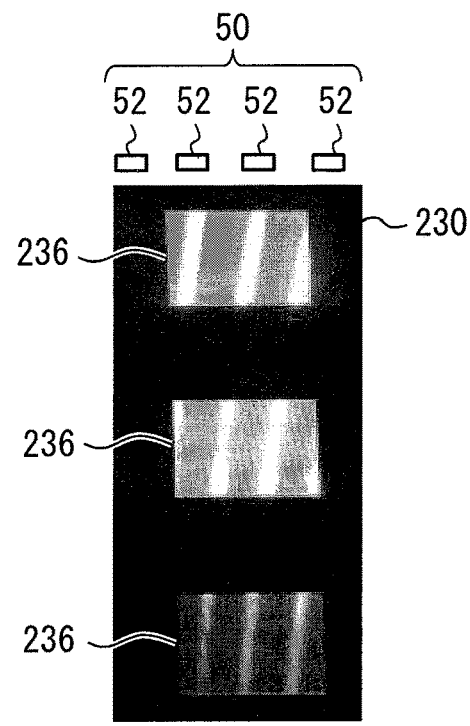
FIG. 17A is a view including a photograph of a pattern of a light guide plate employing a reflecting element of the eighth modification of the first embodiment.
Figure 17B:
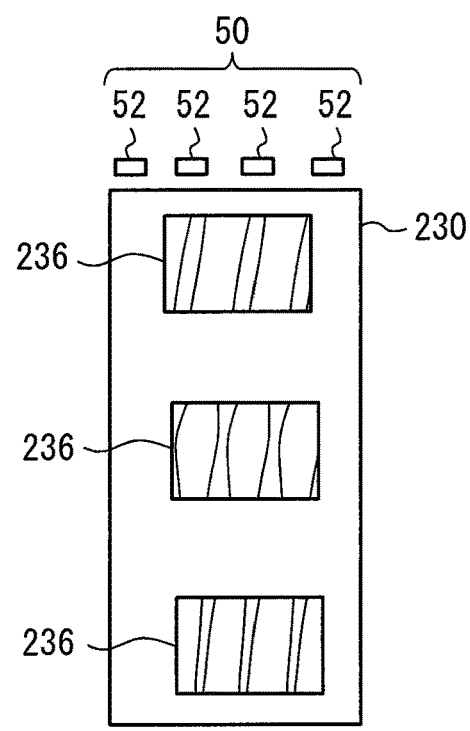
FIG. 17B is a line drawing of FIG. 17A.
Figure 18A:
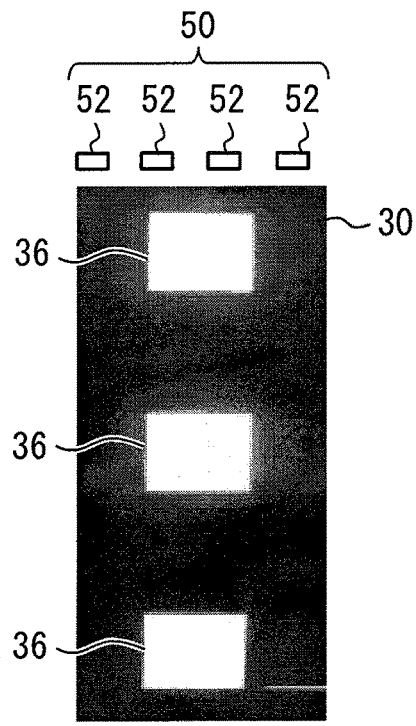
FIG. 18A is a view including a photograph of a pattern of a light guide plate employing a reflecting element of the first embodiment.
Figure 18B:
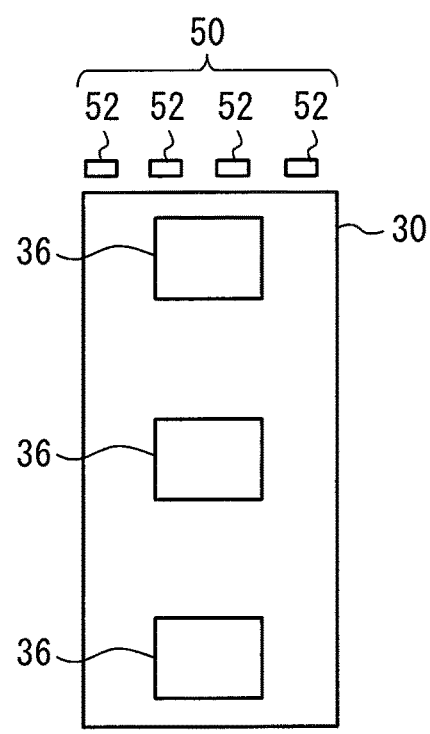
FIG. 18B is a line drawing of FIG. 18A.

Here, the results of experiments by the inventors will be described to compare the reflection element 37 of the first embodiment and the reflection element 237 of the eighth modification. In the comparative experiments, the visually-recognized luminance unevenness of the pattern design reflected by the reflecting portion 36 or 236 is compared. In order to easily compare differences in the luminance unevenness, a pattern constituted by the reflecting portion 36 is formed in a rectangular shape for the experiments. FIG. 17A is a photograph of the light guide plate 230 adopting the reflecting element 237 of the eighth modification from the viewing side to the back side while the light emitting element 52 of the light source unit 50 is turned on. (FIG. 17B is a line drawing of FIG. 17A). FIG. 18A is a photograph of the light guide plate 30 adopting the reflecting element 37 of the first embodiment from the viewing side to the back side while the light emitting element 52 of the light source unit 50 is lit. (FIG. 18B is a line drawing of FIG. 18A). Accordingly, in the reflecting element 237 of the eighth modification, a striped luminance unevenness is generated corresponding to the arrangement interval of the light emitting elements 52 in the pattern. In contrast, in the reflecting element 37 of the first embodiment, the luminance of the pattern is uniform.

Figure 19:
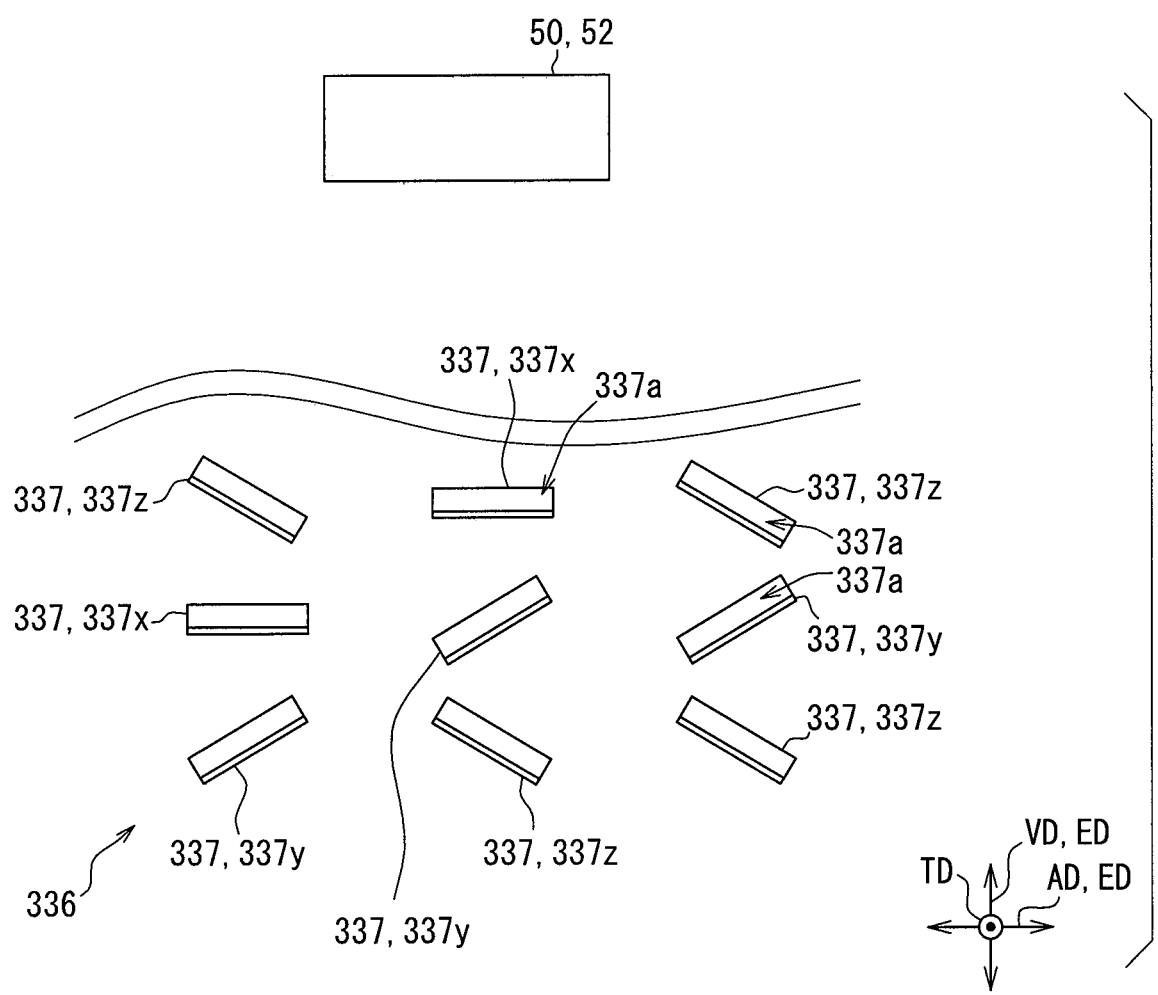
FIG. 19 is a view of a ninth modification of the first embodiment corresponding to FIG. 14.

Further, in a ninth modification, each reflection element 337 of the reflecting portion 336 has the same shape as the reflection element 337 of the eighth modification. In each of the reflecting elements 237 of the eighth modification, the reflection planes 237a are disposed to have the same orientation facing the light source unit 50. In contrast, in the eighth modification shown in FIG. 19, the reflecting element 337 includes reflecting elements 337x, 337y, 337z different in the orientation and arranged random.

Specifically, the reflecting portion 336 includes three kinds of reflecting elements 337x, 337y, 337z. The reflecting element 337x has the reflection plane 337a facing the light source unit 50 along the arranging direction AD. The reflecting element 337y has the reflection plane 337a facing the light source unit 50 at an angle of +30 degrees with respect to the arranging direction AD. The reflection element 337z has the reflection plane 337a facing the light source unit 50 at an angle of −30 degrees with respect to the arrangement direction AD.

The three kinds of reflecting elements 337x, 337y, 337z are arranged at the same pitch as in the first embodiment and the eighth modification, but are randomly selected at respective places. The random arrangement can be designed by distributing three kinds of orientations, for example, based on a pseudo random number generated by a computer or the like. The types of the orientation of the reflecting element 337 may be set to two kinds or four kinds or more.

In a tenth modification, the plural light emitting elements 52 of the light source unit 50 may be replaced with, for example, a surface light source of organic EL to cause the light source light to be incident on the light guide plate 30.

A second embodiment will be described with reference to the drawings.

Figure 20:
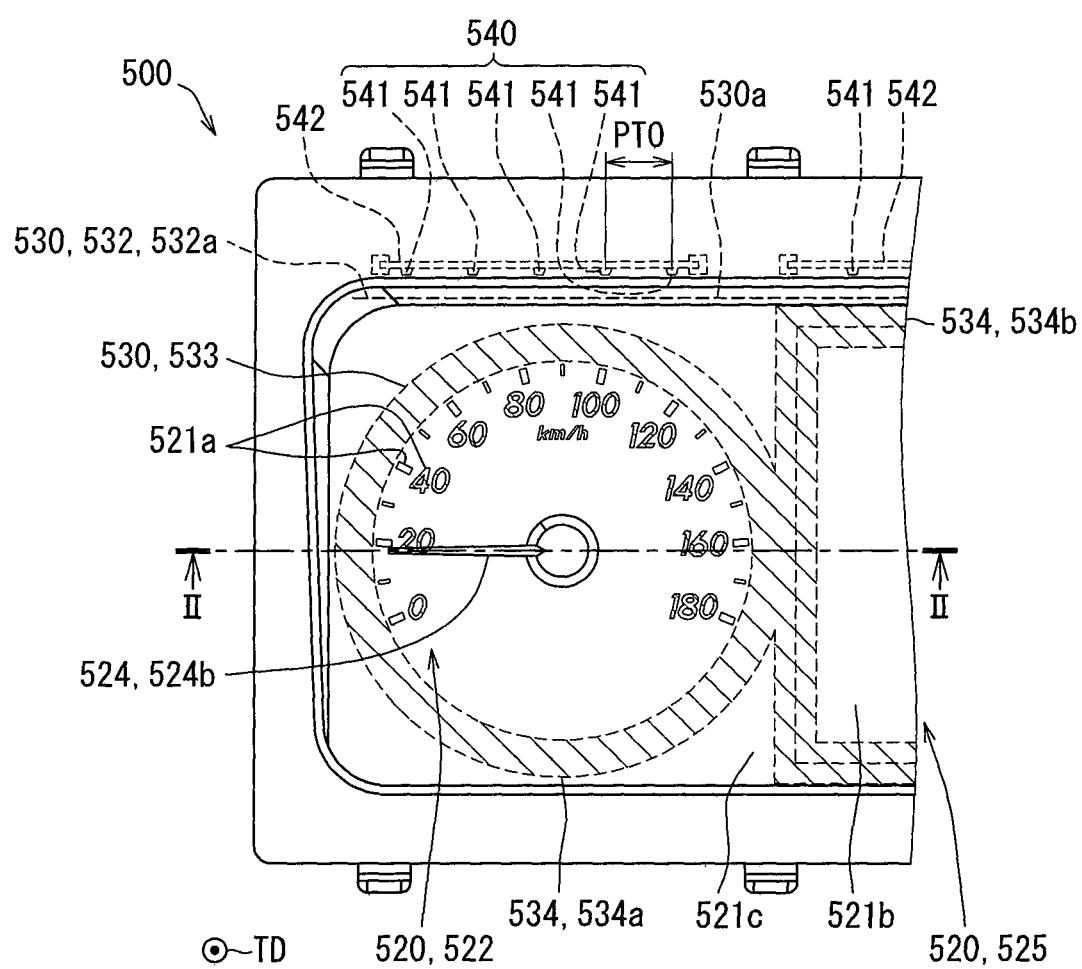
FIG. 20 is a front view illustrating a display device for vehicles according to a second embodiment.

As shown in FIG. 20, a vehicle display device 500 is mounted on a vehicle, and is installed on an instrument panel facing a seat on which an occupant who visually recognizes the device 500 is seated. The vehicle display device 500 is capable of displaying vehicle information toward the viewing side where the occupant is to be positioned.

In the present embodiment, a lower side of the vehicle indicates a gravity direction relative to the vehicle on the horizontal plane. An upper side of the vehicle indicates the opposite direction to the lower side of the vehicle. A left side of the vehicle or a right side of the vehicle indicates a left side or a right side with respect to an occupant seated on the seat.

Figure 21:
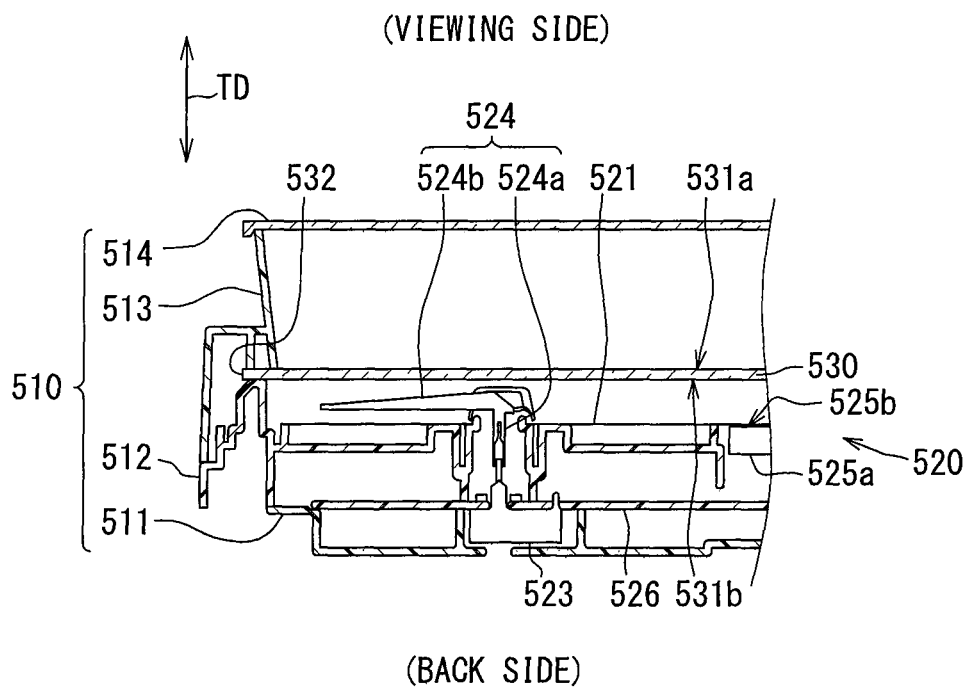
FIG. 21 is a cross-sectional view taken along a line II-II in FIG. 20.

As shown in FIG. 21, the vehicle display device 500 includes a case portion 510, a display body 520, a translucent display plate 530, and a light source unit 540.

The case portion 510 includes a back side case 511, a viewing side case 512, a plate window member 513, and a smoke plate 514. The back side case 511 is made of, for example, synthetic resin to have a light shielding property, and covers the display body 520 from the back side opposite to the viewing side.

The viewing side case 512 disposed on the viewing side of the back side case 511 is made of, for example, synthetic resin with a light shielding property, and is formed in the shape of an outer frame case that surrounds the display body 520 from the outer peripheral side. Further, the viewing side case 512 holds the translucent display plate 530 and the light source unit 540.

The plate window member 513 is made of, for example, a synthetic resin with a light shielding property, and is disposed on the viewing side of the display body 520. The plate window member 513 is formed in a pipe shape having openings on the viewing side and the back side along an outer peripheral contour of the device 500.

The smoke plate 514 is made of a semi-translucent resin such as colored acrylic resin or polycarbonate resin, and is formed in a curved plate shape that closes the entire surface of the viewing-side opening of the plate window member 513. As a result, the display body 520 and the translucent display plate 530 are visually recognized by the occupant through the smoke plate 514. The transmittance of the smoke plate 514 according to the present embodiment is set to about 30% by smoke-like coloring, but may be set to an arbitrary value of 30% or more.

The display body 520 includes a back side display plate 521, multiple pointer display units 522, and an image display portion 525. The back side display plate 521 is also generally called a dial plate, and is disposed between the back side case 511 and the translucent display plate 530. The back side display plate 521 is formed in a flat plate shape by partially applying semi-translucent or light shielding printing on the surface of a translucent base material such as an acrylic resin or a polycarbonate resin. The printing may be replaced with coating.

In the present embodiment, two of the pointer display units 522 are provided, respectively in a left region and a right region of the back side display plate 521. In this example, since the two pointer display units 522 have the same configuration as each other, the left pointer display unit 522 will be described as a representative.

The pointer display unit 522 includes a stepping motor 523 and a pointer 524. The stepping motor 523 is held by a main circuit board 526 disposed further on the back side of the back side display plate 521, between the back side case 511 and the back side display plate 521.

The pointer 524 integrally includes a coupling portion 524a and an indicating portion 524b. The coupling portion 524a is disposed through a through hole provided in the back side display plate 521, and is coupled to a rotation shaft of the stepping motor 523. The indicating portion 524b is disposed on the viewing side of the back side display plate 521 and on the back side of the translucent display plate 530, and has a needle shape. The pointer 524 rotates in accordance with an output of the stepping motor 523, and information of the vehicle is displayed by indicating the corresponding position within the ticks 521a.

The ticks 521a are formed by arraying scales and characters corresponding to the scales in a partial ring shape by printing on the back side display plate 521. In the present embodiment, the ticks 521a in the left-side pointer display unit 522a are indicator for displaying a speed of the vehicle. The ticks 521a in the left-side pointer display unit 522b are indicator for displaying an engine speed of the vehicle.

The image display portion 525 is disposed in a central region of the back side display plate 521. The image display portion 525 includes a liquid crystal display 525a disposed between the back side display plate 521 and the main circuit board 526, in close to the back side display plate 521. The liquid crystal display 525a according to the present embodiment employs a transmissive TFT liquid crystal panel using Thin Film Transistor, TFT which is an active matrix liquid crystal panel formed of multiple liquid crystal pixels disposed in two dimensions. The liquid crystal display 525a has a rectangular display surface 525b for displaying an image on the viewing side.

A region of the back side display plate 521 facing the display surface 525b has a light transmissive region 521b having a transmissive property by not printing in a rectangular shape surrounded by a light shielding region 521c having a light shielding property by printing. The light transmissive region 521b is formed in a size slightly smaller than the display surface 525b. The light of the image displayed on the display surface 525b passes through the light transmissive region 521b of the display plate 521 to the viewing side, and further passes through the translucent display plate 530.

The translucent display plate 530 is made of a synthetic resin such as an acrylic resin or a polycarbonate resin so as to be light transmissive, and has a flat plate shape having a front plate surface 531a and a back plate surface 531b. The translucent display plate 530 is provided substantially in parallel with the back side display plate 521. The front plate surface 531a is formed to face the viewing side, and the back plate surface 531b is formed to face the back side. The translucent display plate 530 of the present embodiment covers the entire surface of the back side display plate 521 from the viewing side, and allows the display by the pointer display unit 522 and the image display portion 525 of the display body 520 to pass through so as to transparently display on the viewing side.

The light source unit 540 has plural light emitting elements 541 arranged on a circuit board 542 for the light source in a straight line at an arrangement pitch PT0. Each light emitting element 541 employs a light emitting diode which is a point-state light source, and emits light by being connected to a power supply. In the present embodiment, each light emitting element 541 is a multicolor light emitting diode, but may be a single color light emitting diode. It is preferable that each light emitting element 541 in a lighting state is controlled to emit light with substantially the same color and substantially the same brightness.

The light source unit 540 is arranged to face the outer peripheral portion 532a, on the upper side of the vehicle, of the outer peripheral portion 532 of the translucent display plate 530. The outer peripheral portion 532a forms an opposing surface 530a in a plane shape opposed to the light emitting elements 541 of the light source unit 540. The light source light emitted from each light emitting element 541 is incident into the translucent display plate 530 through the opposing surface 530a at the outer peripheral portion 532a. In this way, the light source unit 540 can provide light source light.

The light source light introduced into the translucent display plate 530 travels inside as a main traveling direction from the upper side toward the lower side.

Figure 22:
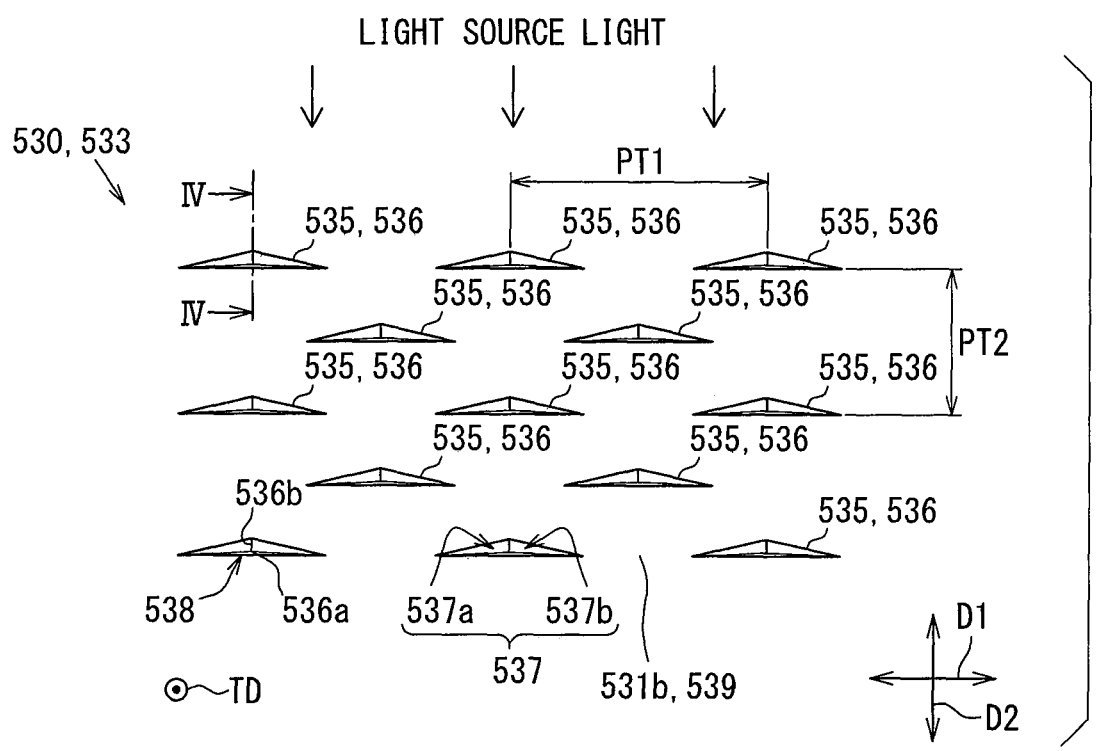
FIG. 22 is an enlarged plan view of a region of a reflective display portion of FIG. 20 in which composite reflecting elements are arranged.
Figure 23:
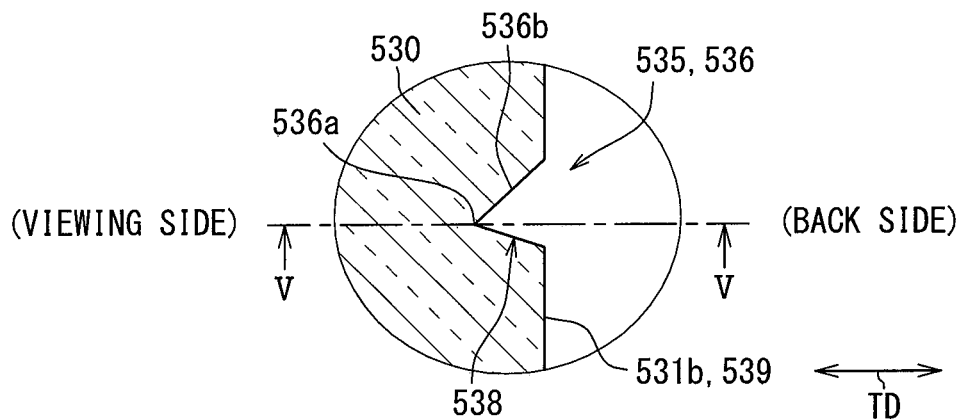
FIG. 23 is a cross-sectional view taken along a line IV-IV of FIG. 22.
Figure 24:
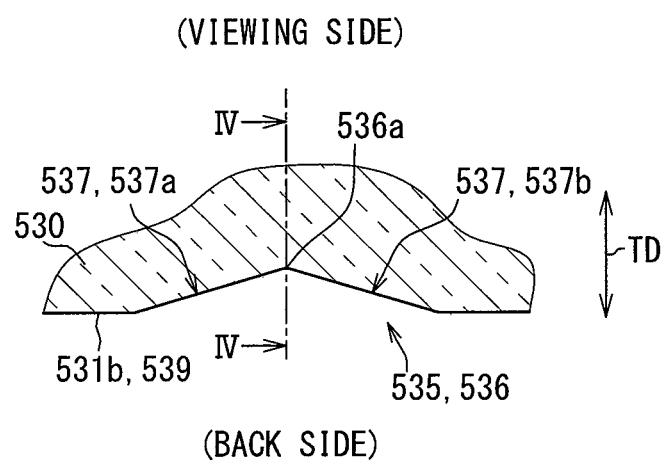
FIG. 24 is a cross-sectional view taken along a line V-V of FIG. 23.

The translucent display plate 530 includes a reflective display portion 533. As shown in FIGS. 22 to 24, the reflective display portion 533 has plural reflecting elements 535 recessed from the back plate surface 531b and having a minute size of a depressed depth of about 5 to 20 μm. The reflective display portion 533 forms a macroscopically visible pattern design 534 due to the appropriate arrangement of the reflecting elements 535. In the present embodiment, the plural reflecting elements 535 are two-dimensionally arranged along the back plate surface 531b, so that the pattern design 534 is formed. Each of the reflecting elements 536 has a reflection surface to reflect the light source light introduced into the translucent display plate 530 to the viewing side, so that the pattern design 534 is displayed in a bright manner.

Specifically, in the present embodiment, the pattern design 534 includes a frame design 534a and a frame design 534b. The frame design 534a is formed in an annular frame shape to border around the entire circumference of the pointer display unit 522. The frame design 534b is formed in a rectangular annular shape to border around the entire periphery of the display surface 525b of the image display portion 525.

The plural reflecting elements 535 include a composite reflecting element 536. In this embodiment, all the reflecting elements 535 constituting the reflective display portion 533 are composite reflecting elements 536.

Each composite reflecting element 536 is recessed in a triangular pyramidal shape from the back plate surface 531b toward the front plate surface 531a. As shown in FIG. 22, each composite reflecting element 536 has an isosceles triangle shape in a plan view seen along the thickness direction TD perpendicular to the plate surface 531b. Each composite reflecting element 536 has a composite reflective surface 537 composed of two inclined surfaces 537a and 537b, and an element back surface 538.

The two inclined surfaces 537a and 537b are respectively disposed at positions corresponding to equal sides in an isosceles triangle shape on a plan view. The two inclined surfaces 537a and 537b are two faces facing the outer peripheral portion 532a on the upper side to which the light source light is introduced, among the planes of the triangular pyramidal composite reflecting element 536, and the outer contour is formed into a triangular planar shape.

Each reflecting element 536 has a straight connecting edge 536b that connects the two reflection surfaces 537a, 537b along a cross-section that bisects an apex angle (or base) of the isosceles triangle in the plan view. The connecting edge 536b is inclined to be away from the outer peripheral portion 532 on the upper side in which the light source light is introduced, as the connecting edge 536b goes from the back plate surface 531b toward the front plate surface 531a. As shown in FIG. 23, the connecting edge 536b has an inclination angle of, for example, 45 degrees with respect to the thickness direction TD. Similarly to the connecting edge 536b, each of the inclined surfaces 537a, 537b is also inclined to be further separated from the outer peripheral portion 532a on the upper side where the light source light is introduced, as going from the back plate surface 531b toward the front plate surface 531a. Each of the inclined surfaces 537a, 537b forms an inclination angle of, for example, 45 degrees with respect to the thickness direction TD on a cross-section parallel to the cross-section bisecting the apex angle.

The two inclined surfaces 537a, 537b are set to be different in the orientation from each other with respect to the outer peripheral portion. Specifically, the two inclined surfaces 537a, 537b are oriented obliquely to each other along the equiangular inclinations of an isosceles triangle shape on a plan view. The inclined surface 537a on the left side slightly faces the left side, and the inclined surface 537b on the right side slightly faces the right side. Specifically, in the present embodiment, the triangular pyramid-shaped composite reflecting element 536 includes a concave bottom portion 536a having the greatest depression depth. As shown in FIG. 24, on a vertical cross-section perpendicular to the cross-section bisecting the apex angle, the two inclined surfaces 537a, 537b are inclined at an angle of inclination of, for example, 10 degrees with respect to the back plate surface 531b and are inclined in opposite directions.

The element back surface 538 is disposed at a position corresponding to a base in the isosceles triangle shape on the plan view, and is formed to face opposite from the outer peripheral portion 532a on the upper side into which the light source light is introduced. The outer contour of the element back surface 538 is formed in a triangular planar shape. The element back surface 538 is inclined to approach the outer peripheral portion 532 on the upper side into which the light source light is introduced, as going from the back plate surface 531b toward the front plate surface 531a, and forms an inclination angle of, for example, 5 degrees with respect to the thickness direction TD.

As shown in FIG. 22, when the light source light is incident on each of the composite reflecting elements 536 from the upper side toward the lower side, the composite reflective surface 537 composed of the two inclined surfaces 537a, 537b reflects the light source light to the viewing side. In this manner, each of the reflecting elements 536 is visually recognized by the occupant on the viewing side in a bright manner.

In the present embodiment, the composite reflecting elements 536 are separated from each other by the arrangement pitch PT1, PT2 respectively set in the arrangement direction D1, D2 through the flat portion 539 formed flat on the back plate surface 531b, independently one by one. The arrangement direction D1 is along main traveling direction of the light source light, e.g., from the upper side to the lower side, and the arrangement direction D2 is substantially perpendicular to the arrangement direction D1.

The composite reflecting elements 536 are arrayed in a so-called staggered pattern in which the positions of the concave bottom portions 536a are shifted by half of the alignment pitch PT1, PT2 for each direction. The arrangement pitch PT1, PT2 of the composite reflection elements 536 is set to an extremely small value with respect to the arrangement pitch PT0 of the light emitting elements 541 of the light source unit 540.

The reflective display portion 533 in which the composite reflecting elements 536 are arranged reflects light source light by each composite reflective surface 537 as described above so that an area where the composite reflecting elements 536 are located in the pattern design 534 is brightened and displayed in a surface light source.

In the present embodiment, uneven illumination is intentionally generated in the light source unit 540 by arranging the light emitting elements 541 which are point light sources. At the outer peripheral portion 532a, the planar opposing surface 530a introduces the light source light inward of the translucent display plate 530 without changing the state of illumination unevenness of the light source light as much as possible. When the light source light from the light source unit 540 is reflected by each composite reflecting element 536, the reflective display portion 533 displays the light source image by the light emitting elements 541 in the form of point light source in the area of the pattern design 534 in which the composite reflecting elements 536 are arranged.

The introduction of such a light source image will be described in detail with reference to FIGS. 25A to 27B. In the present embodiment, the composite reflecting element 536 reflects the light source light by the composite reflective surface 537 constituted by the two inclined surfaces 537a, 537b. Therefore, the appearance of the light source image changes depending on the angle at which the viewer visually recognizes the pattern design 534 of the reflective display portion 533.

Figure 25A:
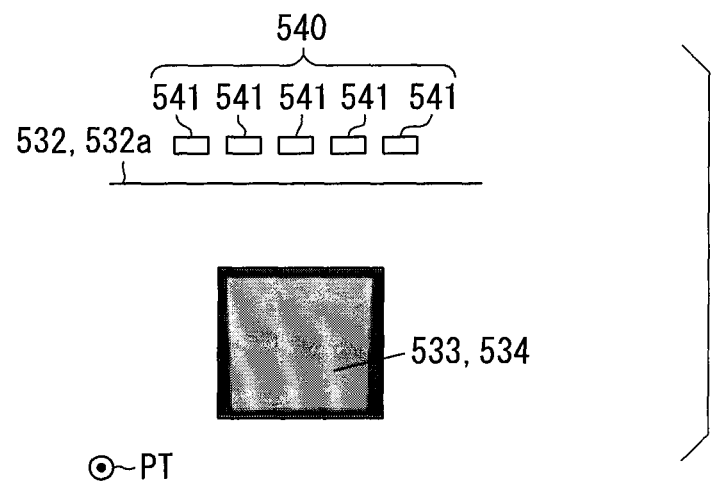
FIG. 25A is a view including a photograph of a reflecting element portion adopting the composite reflecting element of the second embodiment, in which a pattern design is visually recognized by a viewer by looking down slightly from the upper side of the vehicle.
Figure 25B:
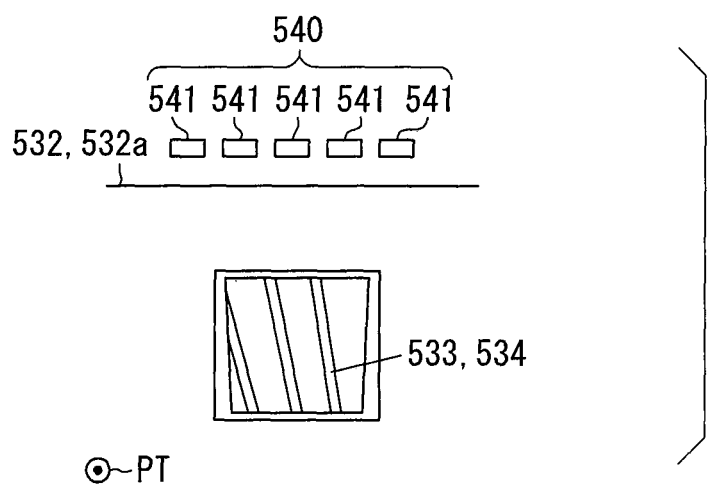
FIG. 25B is a line drawing of FIG. 25A.

Specifically, as shown in FIG. 25A or FIG. 25B, when the viewer views the pattern design 534 by looking down a little from the upper side, plural light source images linearly extended are shown at intervals correspond to the arrangement pitch PT0 of the light emitting elements 541, such that a striped luminance unevenness is caused in the pattern design 534 of the reflective display portion 533.

Figure 26A:
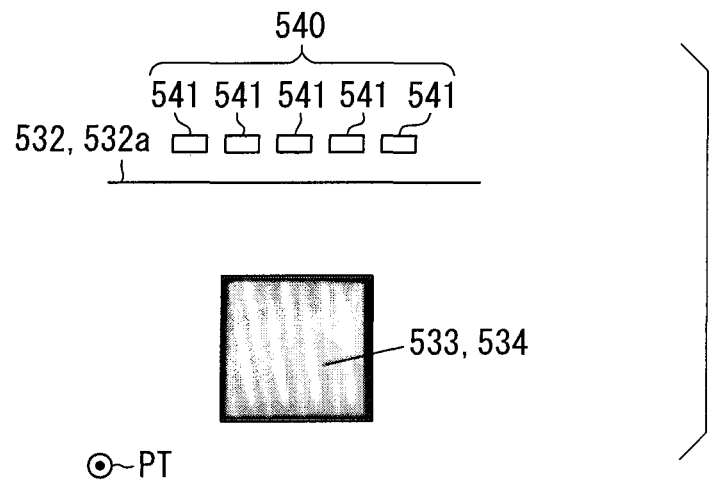
FIG. 26A is a view including a photograph of a reflecting element portion adopting the composite reflecting element of the second embodiment, in which a pattern design is visually recognized by a viewer from the front side along the thickness direction.
Figure 26B:
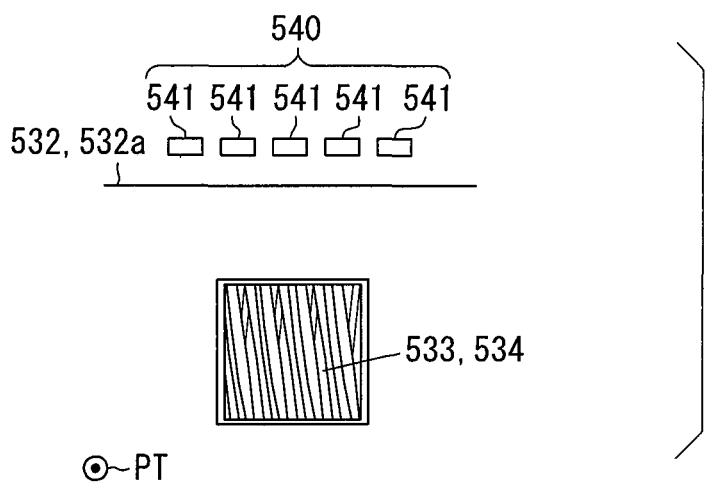
FIG. 26B is a line drawing of FIG. 26A.

As shown in FIG. 26A or FIG. 26B, when the viewer visually recognizes the pattern design 534 from the front side along the thickness direction PT, the light source image linearly extended is twice as much reflected as in the above case, and a complicated striped luminance unevenness is caused in the pattern design 534 of the reflective display portion 533.

Figure 27A:
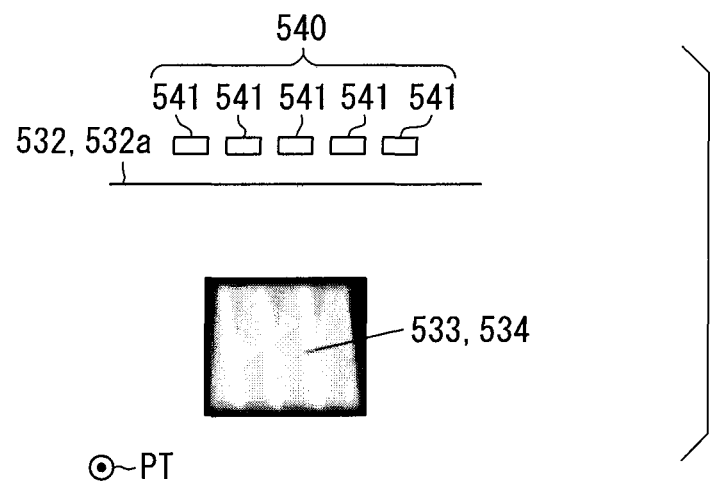
FIG. 27A is a view including a photograph of a reflecting element portion adopting the composite reflecting element of the second embodiment, in which a pattern design is visually recognized by a viewer by looking up slightly from the lower side of the vehicle.
Figure 27B:
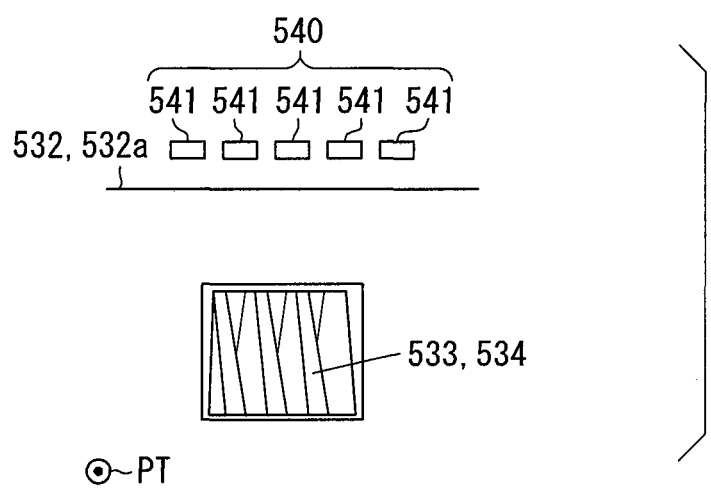
FIG. 27B is a line drawing of FIG. 27A.

As shown in FIG. 27A or FIG. 27B, when the viewer visually recognizes the pattern design 534 to slightly look up from the lower side, the number of light source images linearly extended returns to the initial case, at the interval corresponding to the arrangement pitch PT0 of the light emitting elements 541, such that a striped luminance unevenness is caused in the reflective display portion 533.

If the viewer is, for example, a driver, the pattern design 534 is visually perceived as sparkling as the position of the eye moves accompanying the driving operation of the vehicle.

The pattern design 534 of the reflective display portion 533 which is shiny is displayed together with the display by the display body 520 arranged to face the back plate surface 531b of the translucent display plate 530. Therefore, the display body 520 also functions as a superimposing display unit that performs an overlapping display superimposed on the display of the pattern design 534 toward the viewing side.

When the light source unit 540 does not introduce the light source light into the inside of the translucent display plate 530 by turning off the light, the reflecting elements 536 are not visually recognized due to the fine size and through the flat portion 539.

According to the present embodiment, the two inclined surfaces 537a, 537b provided on the composite reflective surface 537 of the composite reflecting element 536 are formed different in the orientation while being commonly inclined to be distanced from the outer peripheral portion 532a where the light source light is introduced as going from the back plate surface 531b to the front plate surface 531a. In case where the light source light is reflected by the composite reflecting element 536 to the viewing side, when the viewer changes the viewing position, the way of changing the brightness is different between the two inclined surfaces 537a, 537b. Therefore, the pattern design 534 of the reflective display portion 533 including the composite reflecting element 536 is visually recognized as shining brightly. Since the pattern design 534 which shines brightly is displayed by the reflective display portion 533, it is possible to provide the display device 500 with improved appearance for vehicles.

According to the present embodiment, the two inclined surfaces 537a, 537b are two surfaces of the triangular pyramidal composite reflecting element 536 which faces the outer peripheral portion 532a on which the light source light is incident. In this case, it is possible to easily realize a configuration in which the two inclined surfaces 537a, 537b different in the orientation reflect the light source light to the viewing side, to improve the appearance.

According to the present embodiment, the image formed by the light emitting elements 541 as plural point light sources is displayed in the area where the composite reflecting elements 536 are arranged in the pattern design 534. That is, the image formed by the light emitting element 541 is visually recognized by being reflected by the two inclined surfaces 537a, 537b. When the viewer changes the viewing position, since the way of changing the brightness of the image by the light source differs between the two inclined surfaces 537a, 537b, the glittering of the pattern design 534 can be remarkably emphasized. Therefore, extremely novel display which could not exist in the past is realized, and the appearance is further improved.

According to the present embodiment, the plural composite reflecting elements 536 are arranged to be separated from each other through the flat portion 539. Therefore, the luminance and appearance of the pattern design 534 can be adjusted by suitably setting the positional relationship and the ratio of the areas of the composite reflecting element 536 and the flat portion 539. Thus, the range of expression of the pattern design 534 can be expanded. In addition, the composite reflecting element 536 can be made almost invisible to the viewer when the light source unit 540 is turned off, by reducing the size of the composite reflecting element 536 and by setting the area of the flat portion 539 to be a certain percentage or more. Thus, the appearance is improved.

According to the present embodiment, the composite reflecting elements 536 are arranged in a staggered manner in which the positions thereof are shifted by a half of the array pitch for each direction. In this case, a comparatively gentle impression can be provided to the pattern design 534, so that the appearance is improved.

According to the present embodiment, the display body 520 is further provided to face the back plate surface 531b to function as a superimposed display portion which performs an overlapping display superimposed on the reflective display portion 533 toward the viewing side. The display body 520 overlaps with the reflective display portion 533 in which the glittering is produced, so as to realize a display having both unity feeling and stereoscopic effect. Therefore, it is possible to provide the display device 500 with further improved appearance for vehicles.

Although the embodiments are described above, the present disclosure is not construed as being limited to the embodiments, and can be applied to various embodiments within a scope not departing from the spirit of the present disclosure.

Specifically, as a first modification, the composite reflecting element 536 having the composite reflective surface 537 may be only a part of the plural reflecting elements 535 of the reflective display portion 533.

In a second modification, the reflecting elements 535 may be appropriately arranged, to display various symbols such as an index pointed by a pointer, as the pattern design 534.

In a third modification, the composite reflecting element 536 may be formed in a concave shape that is more complicated than a triangular pyramidal shape while being provided with the composite reflective surface 537 constituted by the two inclined surfaces 537a, 537b. In addition to the composite reflective surface 537, the composite reflecting element 536 may have an additional reflective surface.

In a fourth modification, the inclination angles of the two inclined surfaces 537a, 537b can be appropriately set within a range where the function of reflecting the light source light to the viewing side is maintained. In addition, each of the inclined surfaces 537a, 537b may not be perfectly planar, but may be formed into a curved surface that is somewhat curved.

In a fifth modification, the composite reflection elements 536 may not be arranged in a staggered pattern. For example, the composite reflecting elements 535 may be arranged in a rectangular lattice shape, a triangular lattice shape, or a hexagonal lattice shape.

In a sixth modification, the light source unit 540 may have a light source in the form of a surface light source instead of a light source in the form of a point light source.

Figure 28:
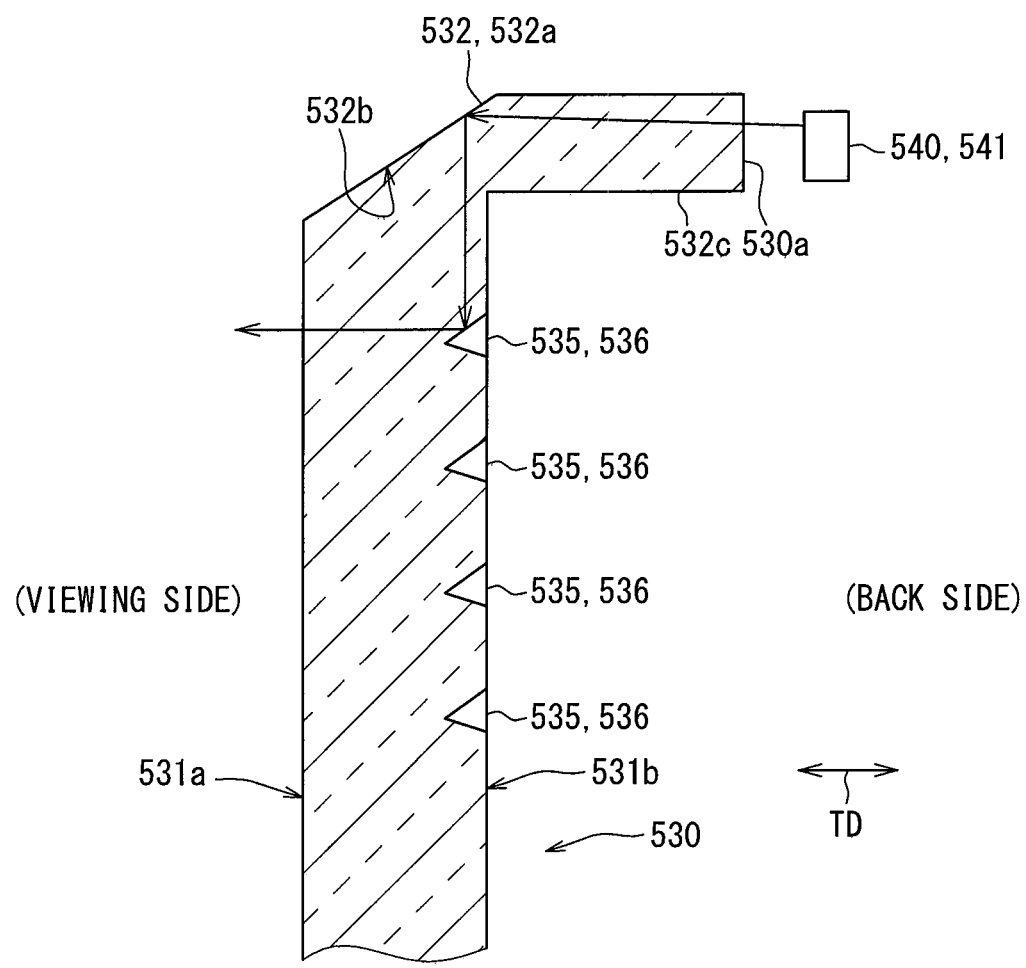
FIG. 28 is a view for explaining an outer peripheral portion in a seventh modification of the second embodiment.

As a seventh modification, as shown in FIG. 28, the outer peripheral portion 532, 532a of the translucent display plate 530 may have a planar reflection surface 532b inclined toward the back side as going outward, and a light guide portion 532c extending from the reflection surface 532b to the back side. In the example of FIG. 28, the plural light emitting elements 541 of the light source unit 540 are arranged to face the opposing surface 530a of the light guide portion 532c on the back side. The light source light emitted from the multiple light emitting elements 541 at positions different from each other is guided to the reflection surface 532b by the light guide portion 532c, and reflected inward of the translucent display plate 530 by the reflection surface 532b. In this way, the light source light is introduced into the translucent display plate 530.

What is claimed is:

1. A display device for a vehicle, comprising:
   a display unit for displaying;
   a light guide plate disposed on a viewing side of the display unit and formed in a plate shape having translucency; and
   a light source unit that causes a light source light to enter inside of the light guide plate through an outer peripheral portion of the light guide plate, wherein the light guide plate includes a reflecting portion having a plurality of reflecting elements to reflect the light source light from the light source unit to the viewing side, the reflecting element has a reflective curved surface formed in a curved surface shape to face the outer peripheral portion where the light source light is incident, and
   an inclination angle of the reflective curved surface and an inclination angle of a reflective back surface of the reflecting element are different from each other with respect to a thickness direction of the light guide plate.

2. The display device according to claim 1, wherein
   the light source unit has a plurality of light emitting elements to emit the light source light in illumination ranges of the light guide plate offset from each other, and
   the reflective curved surface has a curvature in a direction where at least the illumination ranges are offset.

3. The display device according to claim 2, wherein
   the plurality of light emitting elements are arranged in an arrangement direction along an extending direction of the light guide plate, and
   the reflective curved surface of each of the reflecting elements opposes the light source unit.

4. The display device according to claim 2, wherein the reflecting element has a concave hole shape recessed inward from a back side of the light guide plate.

5. The display device according to claim 4, wherein the reflective curved surface is formed in a concave curved shape recessed inward of the light guide plate.

6. The display device according to claim 2, wherein
   the reflective curved surface has a cylindrical surface shape with a generating line arranged along an imaginary plane perpendicular to the direction where the illumination ranges are offset.

7. The display device according to claim 2, wherein
   the reflecting element has a reflective back surface provided on a side opposite to the reflective curved surface through a ridge portion to reflect a display light from the display unit,
   the light guide plate has a flat portion formed flat,
   the reflecting elements are spaced from each other through the flat portion, and
   each of the reflecting elements has a side surface between a side end of the reflective curved surface and a side end of the reflective back surface to cross the direction where the illumination ranges are offset.

8. The display device according to claim 1, wherein
   the reflecting element has a reflective back surface provided on a side opposite to the reflective curved surface through a ridge portion to reflect a display light from the display unit, and
   the reflective back surface is inclined with respect to a thickness direction of the light guide plate so that the display light reflected on the reflective back surface is directed outside a predetermined area.

9. The display device according to claim 1, wherein
   the display unit has an image display portion that displays an image by emitting a display light to the viewing side, and
   the reflecting portion is arranged to overlap with the image display portion in a thickness direction of the light guide plate.

10. A display device for a vehicle, comprising:
    a light source unit that provides a light source light; and
    a translucent display plate made of a translucent plate having
       a front plate surface facing a viewing side, and
       a back plate surface facing a side opposite to the viewing side, wherein the translucent display plate introduces the light source light inside through an outer peripheral portion,
    the translucent display plate includes:
       a plurality of reflecting elements recessed from the back plate surface and having a reflective surface to reflect the light source light introduced into the translucent display plate to the viewing side; and
       a reflective display portion to display a pattern design by an arrangement of the reflecting elements, wherein
    the reflective display portion includes a composite reflection element having two inclined surfaces with opposite orientations to be separated from the outer peripheral portion as going from the back plate surface to the front plate surface, to reflect the light source light, as the reflective surface of the plurality of reflecting elements, and
    an inclination angle of a reflective curved surface of the composite reflection element and an inclination angle of a reflective back surface of the composite reflection element are different from each other with respect to a thickness direction of the translucent display plate.

11. The display device according to claim 10, wherein
    the composite reflection element is recessed in a triangular pyramid shape from the back plate surface, and
    the two inclined surfaces are two surfaces of the triangular pyramid shape of the composite reflection element facing the outer peripheral portion on which the light source light is incident.

12. The display device according to claim 10, wherein
    the light source unit has a plurality of point light sources arranged to each other, and
    the reflective display portion displays an image by the plurality of point light sources in an area of the composite reflection element in the pattern design.

13. The display device according to claim 10, wherein the composite reflection element is one of a plurality of composite reflection elements spaced from each other through a flat portion.

14. The display device according to claim 13, wherein the plurality of composite reflection elements are arranged in a staggered arrangement in which positions of rows are shifted by a half of an arrangement pitch.

15. The display device according to claim 10, further comprising:
 a superimposing display part arranged to face the back plate surface to perform an overlapping display superimposed on the reflective display portion toward the viewing side.

16. The display device according to claim 1, wherein
 the reflective back surface of the reflecting element is provided on a side opposite to the reflective curved surface through a ridge portion to reflect a display light from the display unit,
 the reflective curved surface is inclined in the thickness direction and configured to reflect the light source light to be directed to inside a predetermined area of the vehicle, and
 the reflective back surface is inclined in the thickness direction and configured to reflect the display light entering the reflective back surface to be directed outside the predetermined area.

17. The display device according to claim 10, wherein
 the two inclined surfaces form the reflective curved surface configured to change a brightness in an area of the pattern design,
 the reflective curved surface is inclined in the thickness direction and configured to reflect the light source light to be directed to inside of a predetermined area of the vehicle,
 the reflective back surface is formed in a triangular planar shape inclined in the thickness direction and configured to reflect the display light entering the reflective back surface to be directed outside the predetermined area, and
 an inclination angle of a connecting edge that connects the two inclined surfaces of the composite reflection element and an inclination angle of the reflective back surface of the composite reflection element with respect to a thickness direction of the translucent display plate are different from each other.

\* \* \* \* \*